US009672478B2

(12) United States Patent
B'Far et al.

(10) Patent No.: US 9,672,478 B2
(45) Date of Patent: Jun. 6, 2017

(54) TECHNIQUES FOR SEMANTIC BUSINESS POLICY COMPOSITION

(75) Inventors: Reza B'Far, Huntington Beach, CA (US); Lloyd Boucher, Santa Ana, CA (US); Ryan Golden, Austin, TX (US); Yasin Cengiz, Santa Ana, CA (US); Tsai-Ming Tseng, Santa Ana, CA (US); Logan Goh, Irvine, CA (US); Nigel Jacobs, Austin, TX (US); Malini Chakrabarti, Cliffside Park, NJ (US); Huyvu Nguyen, Orange, CA (US); Mark Stebelton, Chelsea, MI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 491 days.

(21) Appl. No.: 12/714,206

(22) Filed: Feb. 26, 2010

(65) Prior Publication Data
US 2010/0218134 A1    Aug. 26, 2010

Related U.S. Application Data

(60) Provisional application No. 61/155,790, filed on Feb. 26, 2009.

(51) Int. Cl.
| | |
|---|---|
| G06F 3/048 | (2013.01) |
| G06Q 10/00 | (2012.01) |
| G06Q 10/10 | (2012.01) |
| G06F 9/44 | (2006.01) |
| H04L 12/24 | (2006.01) |
| G06Q 10/06 | (2012.01) |

(52) U.S. Cl.
CPC ............. *G06Q 10/00* (2013.01); *G06F 3/048* (2013.01); *G06F 8/34* (2013.01); *G06Q 10/10* (2013.01); *G06Q 10/0637* (2013.01); *H04L 41/0893* (2013.01); *Y10S 715/967* (2013.01)

(58) Field of Classification Search
CPC .. G06F 8/34; G06F 8/38; G06F 3/048; G06Q 10/00; G06Q 10/0637; H04L 41/0893; Y10S 715/967
USPC ....... 715/760, 764, 769, 771, 777, 780, 810, 715/825, 826
See application file for complete search history.

(56) References Cited

U.S. PATENT DOCUMENTS

| | | | |
|---|---|---|---|
| 5,630,025 | A | 5/1997 | Dolby et al. |
| 5,983,272 | A | 11/1999 | Rosen et al. |
| 6,029,144 | A | 2/2000 | Berrett et al. |

(Continued)

OTHER PUBLICATIONS

Bishop, Christopher M., *Pattern Recognition and Machine Learning*, Springer, New York, NY (2006).

(Continued)

*Primary Examiner* — Patrick Riegler
(74) *Attorney, Agent, or Firm* — Kilpatrick Townsend & Stockton LLP

(57) ABSTRACT

Embodiments of the present invention relate to techniques for creating policies. A plurality of objects representative of semantic objects are provided to a user. An arrangement of a subset of the objects, the arrangement representative of a policy, is received. The arrangement is converted to instructions for implementation by an application configured to implement policies. One or more of the objects may include fields and/or controls for specifying criteria of semantic objects represented by the objects.

19 Claims, 19 Drawing Sheets

(56) References Cited

U.S. PATENT DOCUMENTS

| | | |
|---|---|---|
| 6,076,083 A | 6/2000 | Baker |
| 6,081,657 A | 6/2000 | Ott |
| 6,381,564 B1 | 4/2002 | Davis et al. |
| 6,484,261 B1* | 11/2002 | Wiegel .............. H04L 41/0856 715/763 |
| 6,801,883 B1 | 10/2004 | Hurlock |
| 6,917,840 B2 | 7/2005 | Lund |
| 6,980,939 B2 | 12/2005 | Dhir et al. |
| 7,050,863 B2 | 5/2006 | Mehta et al. |
| 7,092,845 B2 | 8/2006 | Keane et al. |
| 7,266,847 B2 | 9/2007 | Pauker et al. |
| 7,321,883 B1* | 1/2008 | Freedy .................. G06Q 10/00 706/45 |
| 7,340,469 B1 | 3/2008 | Alghathbar et al. |
| 7,379,890 B2 | 5/2008 | Myr et al. |
| 7,467,333 B2 | 12/2008 | Keeton et al. |
| 7,493,630 B2 | 2/2009 | Hunt |
| 7,512,965 B1* | 3/2009 | Amdur .................... H04L 63/20 726/1 |
| 7,539,676 B2 | 5/2009 | Aravamudan et al. |
| 7,630,877 B2 | 12/2009 | Brown et al. |
| 7,657,935 B2 | 2/2010 | Stolfo et al. |
| 7,734,564 B2 | 6/2010 | Kaseda et al. |
| 7,770,151 B2 | 8/2010 | Sanjar et al. |
| 7,836,427 B1* | 11/2010 | Li .............................. G06F 8/20 717/107 |
| 8,024,682 B2 | 9/2011 | McConaghy et al. |
| 8,131,677 B2 | 3/2012 | Hsu |
| 8,166,001 B1* | 4/2012 | Grieves .................. G06Q 10/10 707/694 |
| 8,204,719 B2 | 6/2012 | Diao et al. |
| 8,307,343 B2 | 11/2012 | Chaudhuri et al. |
| 8,312,171 B2 | 11/2012 | B'Far et al. |
| 8,315,960 B2 | 11/2012 | Chen et al. |
| 8,438,378 B2 | 5/2013 | Lazar |
| 8,631,046 B2 | 1/2014 | B'Far et al. |
| 8,898,096 B2 | 11/2014 | Caves et al. |
| 8,949,236 B2 | 2/2015 | B'far et al. |
| 8,954,309 B2 | 2/2015 | B'far et al. |
| 2002/0169957 A1* | 11/2002 | Hale ...................... G06F 21/604 713/166 |
| 2002/0191541 A1* | 12/2002 | Buchanan ........... H04L 12/4641 370/230 |
| 2003/0088449 A1 | 5/2003 | Menninger |
| 2003/0110192 A1* | 6/2003 | Valente .................. G06F 21/50 715/234 |
| 2003/0135354 A1 | 7/2003 | Gabele et al. |
| 2003/0229478 A1 | 12/2003 | Rappaport et al. |
| 2004/0006589 A1* | 1/2004 | Maconi ............... G06F 9/44505 709/202 |
| 2004/0068712 A1 | 4/2004 | Heng et al. |
| 2004/0093344 A1 | 5/2004 | Berger et al. |
| 2004/0107124 A1* | 6/2004 | Sharpe .................. G06Q 10/10 705/7.37 |
| 2004/0139095 A1* | 7/2004 | Trastour .................. H04L 69/24 |
| 2004/0167862 A1* | 8/2004 | Yabloko .................. G06N 5/02 706/55 |
| 2004/0210654 A1 | 10/2004 | Hrastar |
| 2005/0007249 A1 | 1/2005 | Eryurek et al. |
| 2005/0038764 A1 | 2/2005 | Minsky et al. |
| 2005/0097449 A1 | 5/2005 | Lumera et al. |
| 2005/0182657 A1 | 8/2005 | Abraham-Fuchs et al. |
| 2005/0209876 A1* | 9/2005 | Kennis .............. G06F 17/30569 726/1 |
| 2005/0262230 A1 | 11/2005 | Liu et al. |
| 2006/0025985 A1 | 2/2006 | Vinberg et al. |
| 2006/0059117 A1* | 3/2006 | Tolson ................. G06F 21/6209 |
| 2006/0195798 A1* | 8/2006 | Chan ........................ G06N 5/04 715/853 |
| 2006/0212486 A1 | 9/2006 | Kennis et al. |
| 2006/0242101 A1* | 10/2006 | Akkiraju .............. G06Q 30/02 |
| 2006/0262740 A1 | 11/2006 | Schirmer et al. |
| 2007/0033188 A1* | 2/2007 | Levy ................ G06F 17/30722 |
| 2007/0033273 A1* | 2/2007 | White ...................... G06F 8/30 709/223 |
| 2007/0143338 A1 | 6/2007 | Wang et al. |
| 2007/0174106 A1 | 7/2007 | Aniszczyk et al. |
| 2007/0192863 A1 | 8/2007 | Kapoor et al. |
| 2008/0010609 A1 | 1/2008 | Curtis et al. |
| 2008/0040245 A1 | 2/2008 | Wadawadigi et al. |
| 2008/0082374 A1* | 4/2008 | Kennis .............. G06F 17/30569 705/7.36 |
| 2008/0082380 A1* | 4/2008 | Stephenson ............. G06F 21/55 726/25 |
| 2008/0109475 A1* | 5/2008 | Burmester et al. ........... 707/102 |
| 2008/0147610 A1 | 6/2008 | Mohanty et al. |
| 2008/0209506 A1* | 8/2008 | Ghai ...................... G06F 21/55 726/1 |
| 2008/0250390 A1* | 10/2008 | Feblowitz .................. G06F 8/34 717/114 |
| 2008/0256121 A1* | 10/2008 | Liu .................. G06F 17/30592 |
| 2008/0270303 A1 | 10/2008 | Zhou et al. |
| 2008/0282321 A1 | 11/2008 | Hecht et al. |
| 2008/0306894 A1 | 12/2008 | Rajkumar et al. |
| 2008/0319937 A1* | 12/2008 | Stuhec .................... G06N 5/025 706/48 |
| 2009/0112780 A1 | 4/2009 | Chen et al. |
| 2009/0183227 A1 | 7/2009 | Isaacs et al. |
| 2009/0198474 A1 | 8/2009 | Fritz et al. |
| 2009/0216731 A1* | 8/2009 | Markovic .............. G06Q 10/10 |
| 2009/0281996 A1* | 11/2009 | Liu ............................ G06F 8/10 |
| 2009/0300002 A1 | 12/2009 | Thomas et al. |
| 2009/0307028 A1* | 12/2009 | Eldon et al. ...................... 705/7 |
| 2009/0319092 A1 | 12/2009 | Piche |
| 2009/0328222 A1 | 12/2009 | Helman et al. |
| 2010/0031240 A1* | 2/2010 | Drumm .............. G06F 17/30864 717/143 |
| 2010/0070422 A1 | 3/2010 | Kikuchi et al. |
| 2010/0174754 A1 | 7/2010 | B'Far et al. |
| 2010/0250779 A1 | 9/2010 | B'Far et al. |
| 2011/0099638 A1 | 4/2011 | Jones et al. |
| 2012/0005631 A1 | 1/2012 | B'far et al. |
| 2012/0030202 A1 | 2/2012 | B'Far et al. |
| 2012/0310618 A1 | 12/2012 | B'Far et al. |
| 2012/0310870 A1 | 12/2012 | Caves et al. |
| 2014/0108461 A1 | 4/2014 | B'Far et al. |
| 2015/0134551 A1 | 5/2015 | B'Far |

OTHER PUBLICATIONS

Bruns, et al., "A Simple and Expressive Semantic Framework for Policy Composition in Access Control," *ACM SIG on Security, Audit and Control*, 10pp (2007).

Codd, E. F., "A Relational Model of Data for Large Shared Data Banks," *Communications of the ACM*, vol. 13, No. 6, pp. 377-387 (Jun. 1970).

De Luca, Ernesto William and Andreas Nurnberger, "Ontology-Based Semantic Online Classification of Documents: Supporting Users in Searching the Web," *Proc. of the European Symposium on Intelligent Technologies (EUNITE)*, 9pp., (2004).

Fukunaga, Keinosuke, *Statistical Pattern Recognition*, Morgan Kaufmann, San Francisco, CA (1990).

Gray, Jim, "The Transaction Concept: Virtues and Limitations," *Proceedings of the 7th International Conference on Very Large Data Bases*, pp. 144-154, Tandem Computers: Cupertino, CA (Sep. 1983).

Huynh, et al., "The Semantic User Interface Paradigm for Presenting Semi-structured Information," 2pp, MIT Artificial Intelligence Laboratory, Cambridge, MA (2002).

Russell, et al., "NITELIGHT: A Graphical Tool for Sematic Query Construction," in *Semantic Web User Interaction Workshop (SWUI)*, 10pp., Florence, Italy (Apr. 2008).

Stanford Center for Biomedical Informatics Research, "The Protégé Ontology Editor and Knowledge Acquisition System," 1pg. http://protege.stanford.edu/ (accessed Jun. 2010).

Taylor, James with Neil Raden, *Smart (Enough) Systems*, Prentice Hall, Boston, MA (2007).

(56) References Cited

OTHER PUBLICATIONS

Weiss, Sholom and Casimir Kulikowski, *Computer Systems That Learn*, Morgan Kaufmann, San Mateo, CA (1991).
Yahoo! Inc., "Pipes: Rewire the Web," 1 pg. http://pipes.yahoo.com/pipes/ (accessed Jun. 2010).
Dean, Jeffrey and Sanjay Ghemawat, "MapReduce: Simplified Data Processing on Large Clusters," *Proceedings of the 6th Symposium on Operating Systems Design and Implementation (OSDI '04)*, 2004, pp. 137-149.
Bates, et al., "Formulation of the Audze-Eglais Uniform Latin Hypercube Design of Experiments," *Advances in Engineering Software*, vol. 34, 2003, pp. 493-506.
Bates, et al., "Formulation of the Optimal Latin Hypercube Design of Experiments Using a Permutation Genetic Algorithm," *Proceedings of the In 45th AIAA/ASME/ASCE/AHS/ASC Structures, Structural Dynamics and Materials Conference*, Apr. 2004.
Chung, I-Hsin and Jeffery Collingsworth, "A Case Study Using Automatic Performance Tuning for Large Scale Scientific Programs," *15th IEEE International Conference on High Performance Distributed Computing*, 2006, pp. 45-56.
Cook, Henry and Kevin Skadron, "Predictive Design Space Exploration Using Genetically Programmed Response Surfaces," *Proceedings of the 45th ACM/IEEE Conference on Design Automation (DAC)*, Jun. 2008.
Goldberg, David, *Genetic Algorithms in Search Optimization and Machine Learning*, 1989, Table of Contents, pp. 41-45, Addison Wesley.
Hassoun, Mohamad H., *Fundamentals of Artificial Neural Networks*, 1995, MIT Press.
Ipek, et al., "An Approach to Performance Prediction for Parallel Applications," *EURO-PAR*, 2005, pp. 196-205.
Ipek, et al., "Efficiently Exploring Architectural Design Spaces via Predictive Modeling," *ASPLOS*, 2006, pp. 195-206.
Kennedy, J. and R. Eberhart, "Particle Swarm Optimization," *Proceedings of IEEE International Conference on Neural Networks*, vol. 4, 1995, pp. 1942-1948.
Li, et al., "Accurate and Efficient Processor Performance Prediction via Regression Tree Based Modeling," Journal of Systems Architecture, vol. 55, 2009, pp. 457-467.
Nelder, John and R. Mead, "A Simplex Method for Function Minimization," *The Computer Journal*, vol. 7 (4), 1965, pp. 308-313.
Ozisikyilmaz, et al., "Efficient Systerm Design Space Exploration Using Machine Learning Techniques," *Proceedings of the Design Automation Conference (DAC)*, Jun. 2008, pp. 966-969.
Ribler, et al., "Autopilot: Adaptive Control of Distributed Application," *Proceedings of the 7th IEEE Symposium on High-Performance Distributed Computing*, Jul. 1998, Chicago, Illinois.
Russel, Stuart and Peter Norvig, *Artificial Intelligence: A Modern Approach*, 2003, Prentice Hall.
Yoo, et al., "Constructing a Non-Linear Model with Neural Networks for Workload Characterization," *Proceedings of the 2006 IEEE International Symposium on Workload Characterization*, Oct. 2006, pp. 150-159, San Jose, California.
U.S. Appl. No. 13/149,701, Notice of Allowance mailed on Jul. 30, 2014, 13 pages.
U.S. Appl. No. 12/846,684, Final Office Action mailed on Mar. 14, 2014, 36 pages.
U.S. Appl. No. 13/149,663, Non Final Office Action mailed on May 16, 2014, 31 pages.
U.S. Appl. No. 13/149,701, Non-Final Office Action mailed on Mar. 11, 2014, 14 pages.
U.S. Appl. No. 14/107,991, Non-Final Office Action mailed on Jun. 2, 2014, 12 pages.
Boning et al., DOE/Opt: a system for design of experiments, response surface modeling, and optimization using process and device simulation, Texas Instruments Semiconductor Process and Design Center, Dec. 7, 1993.
Chen et al., Experience Transfer for the Configuration Tuning in Large-Scale Computing Systems, IEEE Transactions on Knowledge and Data Engineering, vol. 23, No. 3, Mar. 2011, 2 pages.
Cheng et al., Latin Hypercube Sampling in Bayesian Networks, FLAIRS-00 Proceedings, 2000, 6 pages.
Duan et al., Tuning Database Configuration Parameters with iTuned, VLDB, Aug. 24-28, 2009, 12 pages.
Koch et al., Interdigitation for Effective Design Space Exploration Using iSIGHT, Struct. Multidisc. Optim. 23, 2002, pp. 111-126.
Peng et al., PSO for Solving RCPSP, Chinese Control and Decision Conference, 2008, pp. 818-822.
Simpson et al., Metamodels for Computer-based Engineering Design: Survey and Recommendations, Engineering with Computers 17, 2001, pp. 129-150.
Thonangi et al., Finding Good Configurations in High-Dimensional Spaces: Doing More with Less, IEEE International Symposium on Modeling, Analysis and Simulation of Computers and Telecommunication Systems, 2008, pp. 51-60.
Xi et al., A Smart Hill-Climbing Algorithm for Application Server Configuration, WWW2004, May 17-22, 2004, 10 pages.
U.S. Appl. No. 12/684,065, Final Office Action mailed on Feb. 13, 2012, 20 pages.
U.S. Appl. No. 12/684,065, Final Office Action mailed on Apr. 4, 2013, 26 pages.
U.S. Appl. No. 12/684,065, Non Final Office Action mailed on Oct. 7, 2011, 18 pages.
U.S. Appl. No. 12/684,065, Non Final Office Action mailed on Oct. 18, 2012, 25 pages.
U.S. Appl. No. 12/684,065, Notice of Allowance mailed on Sep. 11, 2013, 9 pages.
U.S. Appl. No. 12/749,224, Non Final Office Action mailed on Nov. 9, 2011, 15 pages.
U.S. Appl. No. 12/749,224, Notice of Allowance mailed on Jul. 11, 2012, 8 pages.
U.S. Appl. No. 12/827,068, Final Office Action mailed on May 24, 2013, 13 pages.
U.S. Appl. No. 12/827,068, Non Final Office Action mailed on Jun. 8, 2012, 12 pages.
U.S. Appl. No. 12/827,068, Non Final Office Action mailed on Dec. 19, 2013, 13 pages.
U.S. Appl. No. 12/846,684, Final Office Action mailed on Mar. 1, 2013, 31 pages.
U.S. Appl. No. 12/846,684, Non Final Office Action mailed on Aug. 21, 2012, 24 pages.
U.S. Appl. No. 12/846,684, Non Final Office Action mailed on Oct. 21, 2013, 25 pages.
U.S. Appl. No. 13/149,663, Final Office Action mailed on Jan. 2, 2014, 23 pages.
U.S. Appl. No. 13/149,663, Non Final Office Action mailed on Aug. 19, 2013, 18 pages.
U.S. Appl. No. 13/149,663, Non Final Office Action mailed on Feb. 19, 2013, 15 pages.
Palmero et al., ReSPIR: A Response Surface-Based Pareto Iterative Refinement for Application-Specific Design Space Exploration, IEEE Transactions on Computer-Aided Design of Integrated Circuits and Systems, vol. 28, No. 12, Dec. 2009, pp. 1816-1829.
Yilmaz et al., Main Effects Screening: A Distributed Continuous Quality Assurance Process for Monitoring Performance Degradation in Evolving Software Systems, ICSE, 2005, 10 pages.
U.S. Appl. No. 12/684,065, Advisory Action mailed on May 21, 2012, 3 pages.
U.S. Appl. No. 12/827,068, Advisory Action mailed on Oct. 2, 2013, 3 pages.
U.S. Appl. No. 13/149,663, Notice of Allowance mailed on Sep. 30, 2014, 13 pages.
U.S. Appl. No. 12/846,684, Notice of Allowance mailed on Oct. 7, 2014, 11 pages.
U.S. Appl. No. 12/827,068, "Notice of Allowance", mailed on Mar. 28, 2016, 10 pages.
U.S. Appl. No. 14/107,991, "Final Office Action", rnaiied on Jan. 21, 2015, 12 pages.
U.S. Appl. No. 14/107,991, "Final Office Action", maiied on Feb. 4, 2016, 14 pages.

(56) References Cited

OTHER PUBLICATIONS

Non-Final Office Action for U.S. Appl. No. 14/107,991 dated Jul. 23, 2015, 15 pages.
Final Office Action mailed Mar. 26, 2015 from U.S. Appl. No. 12/827,068, 17 pages.
U.S. Appl. No. 14/107,991, "Notice of Allowance", mailed on May 20, 2016, 8 pages.

* cited by examiner

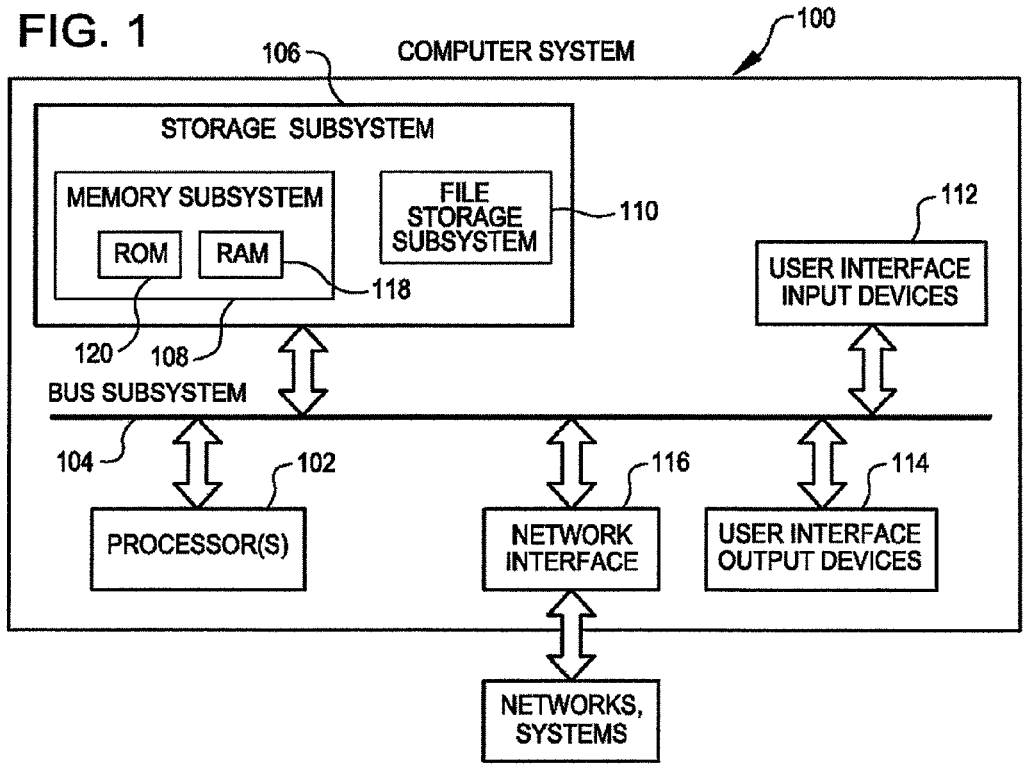
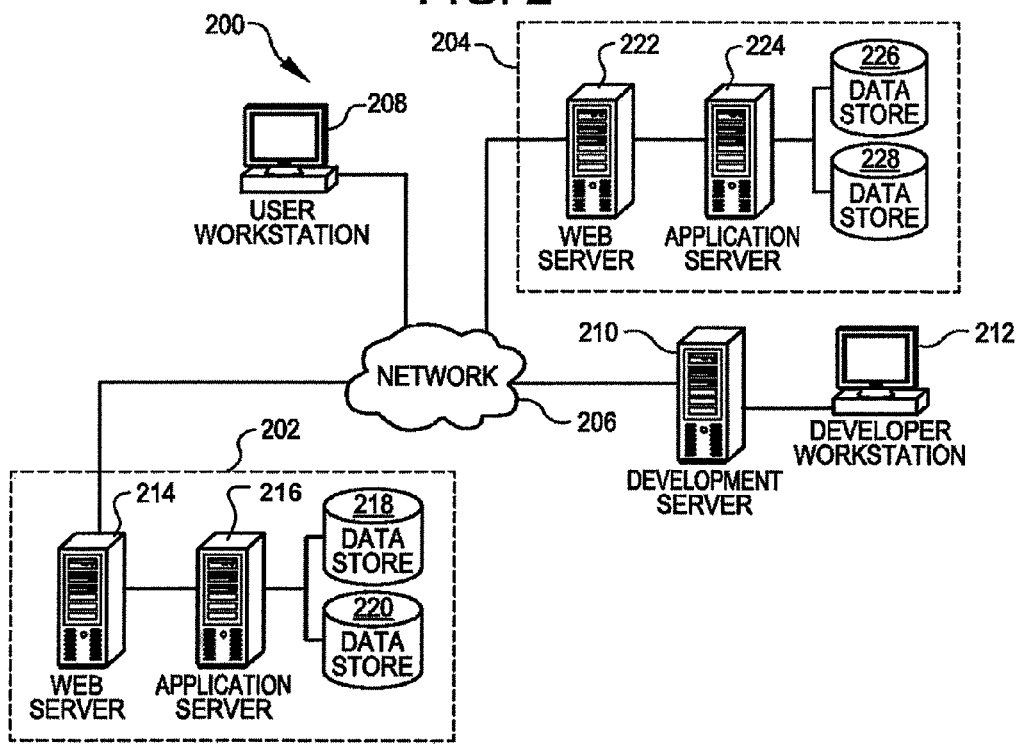

FIG. 5

$$\begin{array}{c} \phantom{P_1} \\ P_1 \\ P_2 \\ P_3 \\ P_4 \\ P_5 \\ P_6 \\ P_7 \end{array} \begin{array}{cccccccccc} A & B & C & D & E & F & G & H & I & J \\ \left[\begin{array}{cccccc|cccc} 1 & 1 & 0 & 0 & 0 & 0 & 0 & 0 & 0 & 0 \\ 1 & 0 & 1 & 0 & 0 & 0 & 0 & 0 & 0 & 0 \\ 1 & 0 & 0 & 1 & 0 & 0 & 0 & 0 & 0 & 0 \\ 0 & 1 & 1 & 0 & 0 & 0 & 0 & 0 & 0 & 0 \\ 0 & 0 & 1 & 0 & 1 & 0 & 0 & 0 & 0 & 0 \\ 0 & 0 & 0 & 1 & 1 & 0 & 0 & 0 & 0 & 0 \\ 0 & 0 & 0 & 0 & 1 & 1 & 0 & 0 & 0 & 0 \end{array}\right] \end{array}$$  — 500

504 ↗

$$506 \nearrow \left[\begin{array}{cccccc} 1 & 1 & 1 & 0 & 1 & 1 \\ 1 & 0 & 0 & 1 & 1 & 1 \\ 1 & 0 & 1 & 1 & 1 & 1 \\ 0 & 1 & 1 & 0 & 1 & 1 \\ 0 & 0 & 1 & 0 & 1 & 1 \end{array}\right]$$

$$\begin{array}{c} \phantom{P_7} \\ P_7 \\ P_8 \\ P_9 \\ P_{10} \\ P_{11} \\ P_{12} \end{array} \begin{array}{cccccccccc} A & B & C & D & E & F & G & I & H & J \\ \left[\begin{array}{ccccc|ccccc} 0 & 0 & 0 & 0 & 1 & 1 & 0 & 0 & 0 & 0 \\ 0 & 0 & 0 & 0 & 0 & 1 & 1 & 0 & 0 & 0 \\ 0 & 0 & 0 & 0 & 0 & 0 & 1 & 0 & 1 & 0 \\ 0 & 0 & 0 & 0 & 0 & 0 & 1 & 1 & 0 & 0 \\ 0 & 0 & 0 & 0 & 0 & 0 & 0 & 1 & 1 & 0 \\ 0 & 0 & 0 & 0 & 0 & 0 & 0 & 1 & 0 & 1 \end{array}\right] \end{array}$$ — 502

$$\left[\begin{array}{cccccc} 1 & 1 & 1 & 1 & 0 & 1 \\ 1 & 1 & 1 & 0 & 1 & 0 \end{array}\right]$$ — 510

FIG. 6

$$600 \rightarrow \begin{bmatrix} & A & B & C & D & E & F & G & I & H & J \\ & 1 & 1 & 1 & 0 & 1 & 1 & 1 & 1 & 0 & 1 \\ & 1 & 1 & 1 & 0 & 1 & 1 & 1 & 0 & 1 & 0 \\ & 1 & 0 & 1 & 1 & 1 & 1 & 1 & 0 & 1 & 0 \\ & 1 & 0 & 1 & 1 & 1 & 1 & 1 & 1 & 0 & 1 \\ & 1 & 0 & 0 & 1 & 1 & 1 & 1 & 1 & 0 & 1 \\ & 1 & 0 & 0 & 1 & 1 & 1 & 1 & 0 & 1 & 0 \\ & 0 & 1 & 1 & 0 & 1 & 1 & 1 & 0 & 1 & 0 \\ & 0 & 1 & 1 & 0 & 1 & 1 & 1 & 1 & 0 & 1 \\ & 0 & 0 & 1 & 0 & 1 & 1 & 1 & 1 & 0 & 1 \\ & 0 & 0 & 1 & 0 & 1 & 1 & 1 & 0 & 1 & 0 \end{bmatrix}$$

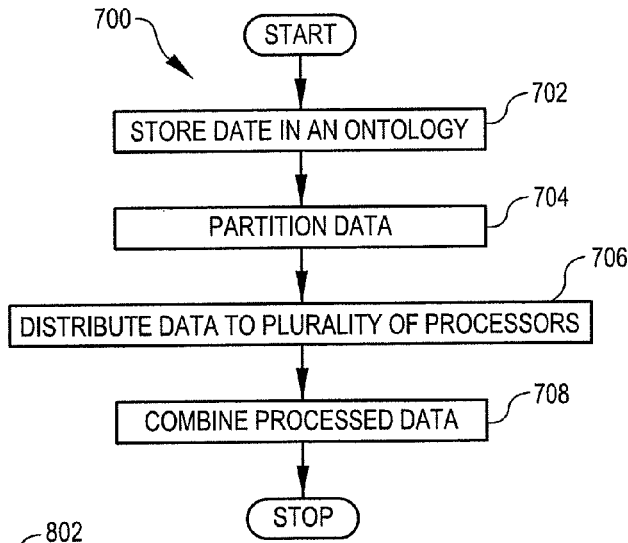

FIG. 7

700
- START
- 702 STORE DATE IN AN ONTOLOGY
- 704 PARTITION DATA
- 706 DISTRIBUTE DATA TO PLURALITY OF PROCESSORS
- 708 COMBINE PROCESSED DATA
- STOP

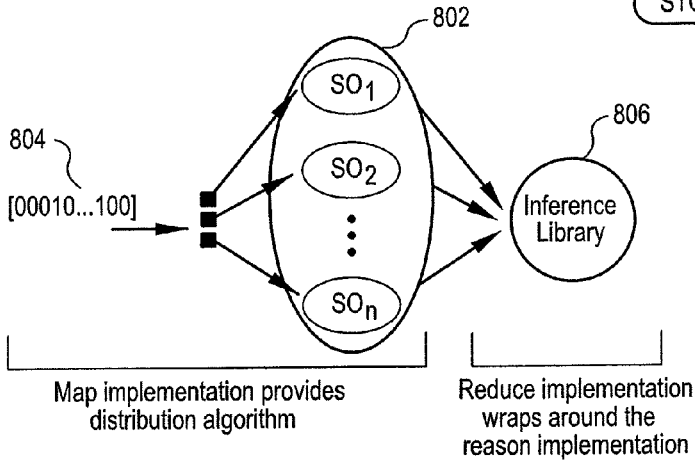

FIG. 8

Map implementation provides distribution algorithm

Reduce implementation wraps around the reason implementation

TECHNIQUES FOR SEMANTIC BUSINESS POLICY COMPOSITION

CROSS-REFERENCES TO RELATED APPLICATIONS

This application claims the benefit of U.S. Provisional Patent Application No. 61/155,790, filed on Feb. 26, 2009, entitled "TECHNIQUES FOR SEMANTIC BUSINESS POLICY COMPOSITION," the entire contents of which is incorporated by reference in its entirety for all purposes.

BACKGROUND

Embodiments of the present invention relate to policies, and more specifically to techniques for creating business policies.

Businesses often have internal business policies intended to address a wide range of issues such as security, privacy, trade secrets, criminal activity of employees or others with access to the business, and many others. These business policies address various aspects of a business, such as purchasing, selling, marketing, and internal administration. Because of the large number of activities occurring during the course of running a business, which may have various entities located in a variety of geographical locations, it is often impractical to manually monitor all activities in which improper behavior or mistakes may occur.

One approach to implementing business policies has been to monitor and control computer systems used to facilitate a business's activities. For example, information regarding various activities, such as sales and payroll, are often stored in one or more data stores. This information may be analyzed to find activity that might be in violation of a business policy, such as an item on an invoice or paycheck to an employee being outside of a specified range, or a particular employee attempting to access information to which he or she is not entitled access.

Typically, analyzing data requires a high level of technical expertise as the data is often created and stored using a wide variety of business applications which often have differing standards and specifications, are often custom built for specific purposes, and often lack ability to communicate and share information with one another. Consequently, in order to enact business policies, the expertise of those familiar with the business applications to which the business policies are to be implemented is often required. For instance, in order to analyze data stored in a relational database, a person may have to be able to construct a proper SQL statement. Generally, commonly-used applications typically require users to model policies in SQL, PL/SQL, or another application-specific or storage-specific language.

Those making the business policies, however, are often not the same people with detailed knowledge of the business' systems to which the policies are to be applied. For instance, a person or group of people deciding that, to prevent employee fraud, all payments over a specific amount should require approval by an appropriate person, may not have any understanding how invoice data is stored in the business' systems. Such policy makers would prefer to define policies in terms that they understand, such as "user", "general ledger", "organization", etc., and not in terms of the applications with which policies will be implemented, such as "database schema x on host 55.55.55.55", "FND_USER table", and "application Y". Such policy makers would likely prefer not to take the time necessary to learn the specific application terminology as their duties typically do not require such technical expertise.

Moreover, because businesses typically use several different applications to facilitate their activities, it can be burdensome for policy makers to learn specific terminology for several applications. Policy makers would rather prefer that they can use an intuitive interface in order to apply familiar terminology to create policies that may be applied to a variety of applications, without having to create a similar policy for each application.

Previous applications for implementing business policies have included applications that work with specific business applications, and that require users to have an underlying understanding of the technical design of those business applications. One possible reason for this is that database runtimes, which are frequently the underlying runtime for business applications, cannot easily share runtime resources across instances; and most solutions to policy modeling have either used single database instances or single database connections to support their runtime requirements.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments of the present invention provide techniques for defining analysis for implementation of policies. In one embodiment, a method for defining an analysis is disclosed. The method may be performed under the control of one or more computer systems configured with executable instructions. Also, in an embodiment, instructions for performing the method, or variations thereof, may be included on a computer-readable storage medium.

In an embodiment, the method includes providing a plurality of objects to a user through a interface where the objects are representative of semantic objects. An arrangement of a subset of the objects may be received, where the arrangement is representative of an analysis to be performed as part of implementation of a policy. The arrangement may be based at least in part on interaction by the user with the interface. The arrangement may be converted to executable instructions suitable for execution by an application configured to operate according to the instructions. For example, executable instructions may be generated based at least in part on the arrangement.

At least one of the objects may include a field configured to allow user-definition of criteria for a semantic object corresponding to the object. Further, the arrangement may include a first object representative of a first semantic object and a second object representative of a second semantic object where the second semantic object represents an attribute of the first semantic object. The arrangement of the subset of the objects may include an analytic object representative of a data analysis technique to be applied during implementation of the policy.

In an embodiment, the method may also include providing an analytic object representative of an analysis to be performed as part of implementing the policy. Also, the arrangement may be based at least in part on a association of the analytic representation with at least a subset of the objects. Also, the method may include receiving a grouping of a plurality of members of the subset of objects and performing a user-specified analysis on data corresponding to the members.

In accordance with another embodiment of the invention, a system for creating policies is disclosed. The system may include a computing device configured to allow user-creation of an arrangement of objects where each of the objects represents a semantic object and the arrangement represents an analysis to be performed as part of implementation of a policy. The system may also include a data store for storing data and a policy engine configured to perform analysis created with the computing device with respect to the data.

In an embodiment, the computing device is further configured to convert the arrangement of objects to a form suitable for use by the policy engine. The arrangement of objects may include a first object representative of a first semantic object and a second object representative of a second semantic object where the second semantic object is an attribute of the first semantic object. In an embodiment, the computing device is further configured to provide user-defined criteria for said semantic objects and may allow user selection of a data analysis technique to be applied during implementation of the policy. Further, the computing device may be configured to include an analytic object as part of the arrangement, the analytic object representative of a particular analysis to be performed by the policy engine when applying the policy.

In yet another embodiment, a computer-readable storage medium having stored thereon instructions for controlling at least one processor of one or more computer systems to generate executable instructions is disclosed. The instructions, in an embodiment, include instructions that cause said at least one processor to provide a plurality of objects to a user through a interface, the objects representative of semantic objects; instructions that cause said at least one processor to receive an arrangement of a subset of said objects, the arrangement representative of an analysis to be performed as part of implementation of a policy, said arrangement based at least in part on interaction by the user with the interface; and instructions that cause said at least one processor to generate, based at least in part on the arrangement, executable instructions suitable for implementation by an application configured to operate according to the instructions.

In an embodiment, one of said objects includes a field configured to allow user-definition of criteria for a semantic object corresponding to the object. The arrangement may include a first object representative of a first semantic object and a second object representative of a second semantic object, the second semantic object being an attribute of the first semantic object. In addition, in an embodiment, the arrangement of the subset of said objects includes an analysis object representative of a data analysis technique to be applied during implementation of the policy. The instructions may further comprise instructions that cause said at least one processor to provide an analytic object representative of a data analysis technique to be performed as part of implementing the policy; the arrangement may be based at least in part on a association of the analytic representation with at least a subset of the objects. The instructions may also comprise instructions that cause said at least one processor to provide an analytic object representative of an analysis to be performed as part of implementing the policy, where the arrangement is based at least in part on an association of the analytic representation with at least a subset of the objects. In an embodiment, the arrangement includes a first object connected with a second object. Also, the instructions may include instructions that cause said at least one processor to receive a grouping of a plurality of members of the subset of objects and performing a user-specified analysis on data corresponding to the members.

For a fuller understanding of the nature and advantages of the present invention, reference should be made to the ensuing detailed description and accompanying drawings.

BRIEF DESCRIPTION OF THE DRAWINGS

FIG. 1 shows a simplified block diagram of a computer system that may be used to practice an embodiment of the present invention;

FIG. 2 shows an example of an environment in which embodiments of the present invention may be practiced;

FIG. 5 shows results of a map function derived from the matrix of FIG. 4, in accordance with an embodiment;

FIG. 6 shows an inference library created from the map function output of FIG. 5;

FIG. 7 shows a method for processing data according to the process demonstrated in FIGS. 3-5, in accordance with an embodiment;

FIG. 8 shows a graphical representation for updating an inference library, in accordance with an embodiment;

FIGS. 19A-19E show an example of various pages of an interface that may be used in accordance with an embodiment.

DETAILED DESCRIPTION OF THE INVENTION

Figure 3:
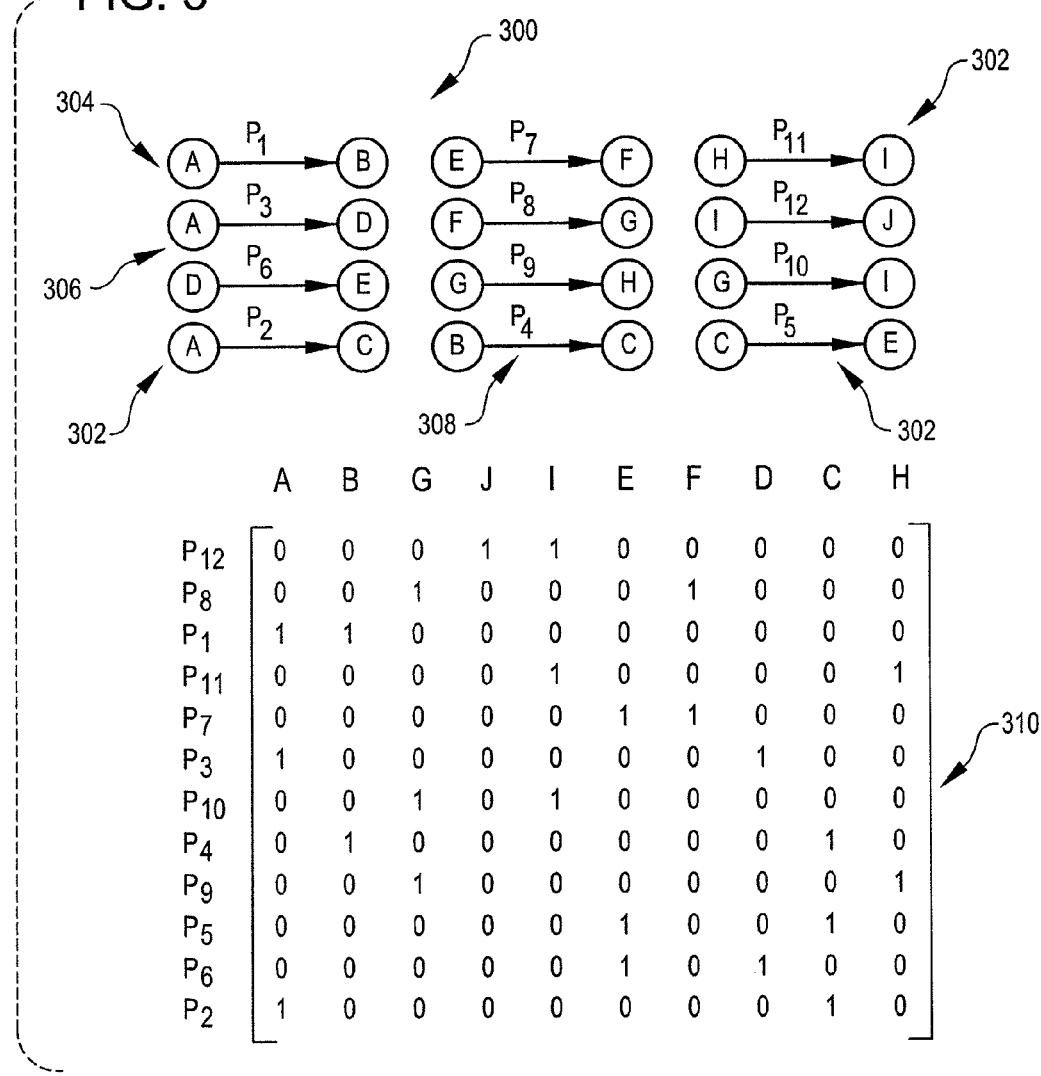
FIG. 3 shows a data set of an ontology and a matrix encoding the data set, in accordance with an embodiment.

In the following description, for the purposes of explanation, specific details are set forth in order to provide a thorough understanding of embodiments of the invention. However, it will be apparent that the invention may be practiced without these specific details.

The following description describes an embodiment of the present invention in the business policy domain, and specifically with implementing business policies using ontologies that encode business data. However, the scope of the present invention is not restricted to business policies, but may be applied to other domains or applications. For example, any domain or application where a set of rules or criteria is used to analyze data may make use of the present invention. Examples of domains in which embodiments of the present invention may be used include segregation of duties, separation of powers, transaction monitoring, fraud or other crime detection, semantic web applications, and generally applications dealing with large sets of data.

In general, embodiments of the present invention provide techniques for creating policies to be applied to data. As used herein, unless otherwise clear from context, a policy is a set of one or more conditions and a set of one or more actions to be taken when the set of conditions is met. For example, a policy may be that all transactions of a certain type (such as credit card charges) over a specified amount require approval by a person of a specified class, such as a manager. In this example, the conditions of the policy are that transactions have a specified type and amount and an action of the policy is authorization of transactions meeting the conditions by a person of a specified class. An action of a policy may also be simply identification of data that meet the policy's condition(s). For example, a policy may specify that all transactions of a certain type and over a certain amount should be identified. In this example, the conditions are the same as in the previous example, but the action is identification of transactions meeting the conditions so that, for example, a manager may review the identified transactions and investigate any transactions he or she deems suspicious.

Typically a policy is used to implement a business policy which is one or more rules, guidelines, and/or principles related to the conduct of a business. For instance, a business policy specifying that invoices over a specific amount require manager approval may be implemented by creating a policy that includes criteria for identifying invoices over the specified dollar amount from information stored in one or more data stores.

In a specific embodiment, business data is encoded in an ontology and the ontology is processed in order to ensure that business policies are followed. Processing the ontology involves applying graph partitioning techniques in order to distribute the data over a plurality of reasoner instances, where a reasoner instance is one or more processors implementing one or more reasoners. Typically, each reasoner instance will comprise a single processor implementing a single reasoner, although more processors and/or reasoners may be possible in a reasoner instance. MapReduce techniques, discussed below, may be used to coordinate the actions of a plurality of reasoners operating over the nodes. Algorithmic matrix-based methodology is used throughout the partitioning and reasoning process.

Turning now to the drawings, FIG. 1 is a simplified block diagram of a computer system 100 that may be used to practice an embodiment of the present invention. Computer system 100 may serve as a user workstation or server, such as those described in connection with FIG. 2 below. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device in order to execute commands in connection with implementation of specific embodiments of the present invention, such as to implement, define policies, and/or configure various components of an enterprise system, such as that described below in connection with FIG. 2.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Results of implementing policies, defining policies, and configuring various components of a computer system may be output to the user via an output device.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, personal digital assistant (PDA), cellular telephone, a server, or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

FIG. 2 shows a simplified block diagram of an enterprise computer system 200 that may be used to practice an embodiment of the present invention. It should be understood that, generally, enterprise computer systems vary greatly and, as a result, specific embodiments may include more or less components than shown in the figure and that the specific components shown in FIG. 2 are only intended to provide an example for the purposes of illustration.

In accordance with an embodiment, the enterprise computer system 200 includes a first location 202 and a second location 204 communicatively connected by a network 206, such as the Internet or any suitable communications network or combination of networks. In an embodiment, the first location 202 and second location 204 correspond to separate physical locations of a business, such as offices in two separate cities, states, or countries. While FIG. 2 shows two locations, it should be understood that a business may have only a single location and may include more than two locations. As shown in the drawing, the enterprise computer system 200 may include one or more user workstations 208, a development server 210, and a developer workstation 212. The user workstation 208, development server 210, and/or development workstation 212 may be physically present at any of the locations, or at separate locations. In an embodiment, the user workstation 208 and development server 210 are communicatively connected to the network 206 so as to access various components of the enterprise computer system. For example, the user workstation 208 may include a browser used for viewing content provided from the Internet and/or from other systems within the business. Further, the developer workstation 212 may be connected to the network 206 through the development server 210 and may be adapted to enable certain employees within the organization to configure, install, modify, and perform other actions in connection with the business' computing systems. As an example, a developer within the organization may utilize the developer workstation in order to create policies that are used to define policies and execute one or more applications that stores data in one or more ontologies, and that reason the data according to the policies in accordance with various embodiments of the invention. Instructions for controlling the applications and the defined policies may be sent over the network 206 to an appropriate computing device executing the one or more applications.

As noted above, the first location 202 may include various computer systems used in operating the business. For example, as depicted in FIG. 2, the first location 202 includes a web server 214 configured to receive requests from various users, such as from a user of the user workstation 208, and to respond to the requests over the network 206. While FIG. 2 shows the web server as a hardware component, as with any of the servers described herein, the web server may also be a software module operating on a computer system. Responses from the web server 214 may be provided from the web server 214 itself or through the web server 214 but from a variety of sources in communication with the web server 214, such as from components of an internal computer system of the first location 202 or from other web servers located at other, possibly third-party, locations.

In an embodiment, the web server 214 is communicably coupled to an application server 216, which is a hardware component or software module configured to run one or more applications, such as one or more policy engines and other applications for managing organizational data. As is known, a user of the user workstation 208 may send a request to the web server 214 that specifies a specific action to be taken in connection with an internal business application implemented on the application server 216. The web server 214 then relays the request to the application server 216 which takes the specified action and returns the result of that action to the web server 214, which in turn relays the result to the user workstation 208. In accordance with an embodiment, the web server 214, or other component, may modify the content returned to the user workstation 208 in accordance with one or more policies applicable to a user of the user workstation 208.

As shown in the example of FIG. 2, the application server 216 interacts with data stored in a first data store 218 and a second data store 220, each of which may store data relevant to the business' operation, such as in one or more relational or other databases. While the disclosed example shows the first location 202 having two data stores, it should be understood that the first location 202 may have less than two data stores or more than two data stores. Information in the data stores can include a wide variety of data, such as data relating to business transactions, invoices, human resources data, user account data, receipts, bank account data, accounting data, payroll data, and generally, any data relevant to the operation of a particular business. Information from the data stores 218, 220, and other sources, may be extracted from the data stores, converted to a uniform format, and stored in an ontology in accordance with an embodiment.

In an embodiment, the second location includes its own web server 222, application server 224, first data store 226, and second data store 224 which may be configured to function similarly to the identically named components above.

FIG. 7 shows a flowchart demonstrating a method 700 for processing data in accordance with an embodiment. The method 700 (or any method disclosed herein), for example, can include techniques described below in connection with FIGS. 3-8. As with any method disclosed herein, the method depicted in FIG. 7, or variations thereof and/or combinations thereof, may be implemented by software (e.g., code, instructions, program) executing on a processor, by hardware, or combinations thereof. The software may be stored on a computer-readable storage medium, for example, in the form of a computer program comprising a plurality of instructions executable by one or more processors.

In an embodiment, data is stored in an ontology by creating ontology data from various business data sources at a data storage step 702. As noted below, the data can be enterprise business data or, generally, any type of data. Storage of the data can be performed in a variety of ways. For instance, in an embodiment, a batch process is periodically executed that causes data stored in data stores to be compiled into an ontology. For instance, data stored in a first form can be transformed using one or more adapters configured to convert data from a first form to a form suitable for storage in the ontology. In addition, automatic Extract, Transfer, and Load (ETL) operations from a business' data sources to a semantic data store that embodies the ontology may be defined and set to run when trigger conditions are met, such as at certain times or when a certain amount of data has been changed.

At a partitioning step 704, the ontology data is partitioned so as to be distributable among a plurality of processors. Each processor may implement the same or a different reasoner instance. Partitioning the data may include encoding the ontology data in a matrix, such as in a manner described below, and partitioning the matrix using one or more matrix partitioning techniques. In alternate embodiments, the ontology data is not necessarily encoded in a matrix, but is distributed using other methods. For instance, because ontologies can be represented as graphs, such as directed graphs, graph partitioning techniques may be used. Generally, any technique for partitioning data among a plurality of reasoners may be used.

At a distribution step 706, the partitioned ontology data is distributed among a plurality of processors, each of which may implement of instances of the same or a different reasoner. Techniques, such as those described in *Map Reduce: Simplified Data Processing on Large Clusters*, by Jeffery Dean and Janjay Ghemawat, published at the Sixth Symposium on Operating System Design and Implementation, which is incorporated by reference for all purposes, may be used to coordinate the actions of the reasoners. In this manner, the processing of the ontology data is performed by a plurality of reasoners so as to reduce the time necessary for processing. At a combination step 708, the results of the processing by the plurality of reasoners are combined into a set of processed data. Combination may include connecting results of separate processing according to relationships associating different sets of separately-processed data, such as data encoded in intersection vectors, such as those described above. Again, in an embodiment, MapReduce techniques may be used to coordinate combination the results from the reasoners.

In this manner, the work done in processing an ontology is performed efficiently and more quickly than if the ontology was processed with a single reasoner. Other benefits in using the above method are also incurred. For example, the embodiments of the disclosed method allow for efficient handling of new and/or modified data, as described in more detail below in connection with FIG. 8.

As businesses and other organizations operate, the data they store changes as a result of business operations. New invoices are created, new payments are made to vendors, employee roles change, new people or organizations become customers, peoples' position within an organization changes, and other events happen during the course of operating a business that may influence the addition, subtraction, or modification of associated data. Moreover, because the amount of data stored by a business is typically very large, creation or modification of an ontology based on the data typically takes a large amount of resources and, therefore, is performed as a batch process, often during times when a business' systems are under a lighter work load, such as at a time of the day when many employees may be at home or when most potential customers are asleep.

FIG. 3 shows a representation of an example data set 300 stored in an ontology, in accordance with an embodiment. It should be understood that the data set 300 is given for purposes of illustration and typically data sets for businesses or other organizations will be larger and more complex. In an embodiment, the data set 300 comprises a plurality of triples 302 where a triple includes a first node, a second node, and a relationship between the first and second nodes. For example, a first triple 304 includes a first node A, a second node B, and a relationship $P_1$ between A and B. Each node in a triple may represent a data point, such as a piece of information stored in a database of a business or used in connection with operation of such a database. Each node can be a simple piece of information such as an employee name, a particular line item, a particular invoice, a class of employees, or generally any type of information or class of information that can be stored. Each node can also represent more complicated sets of information such as complete data records or files or classes of information including attributes of the class.

As a concrete example, A may represent John Doe and B may represent a specific class of employee, such as a manager. In the relationship shown in the example of the first triple 304, $P_1$ connecting A to B indicates that John Doe is a manager. As shown in the example in FIG. 3, relationships between nodes may be directional, as indicated in the example by an arrow. For example, continuing with the example of the first triple 304, the arrow extending from A to B indicates that John Doe is a manager but not necessarily that all managers are John Doe. A node may relate to more than one other nodes. For example, FIG. 3 shows a second triple 306, showing a relationship $P_3$ between the node A and a node D. Thus, considering both the first triple 304 and the second triple 306, it can be seen that the node A relates to both B and to D by two different relationships. Specifically, A is related to B by $P_1$ and related to D by $P_3$. For example, D may indicate a class of employees having access to a particular system, such as a security system, accounting computer system, and the like. Thus, read together, the first triple 304 and second triple 306 indicate that John Doe is a manager, and John Doe also has access to the system represented by D. In addition, various nodes can be related to each other through inferred relationships. Briefly, for example, FIG. 3 shows a third triple 308 showing a relationship $P_4$ between nodes B and C. Continuing the example discussed above, C may be a specific set of accounting data for an organization. Thus, the relationship represented by the third triple indicates that all managers have access to the accounting data. Thus, when reading the first triple 304 and the third triple 308 together, a relationship between A and C may be inferred that John Doe has access to accounting data because John Doe is a manager. Further details on inferred relationships are provided below.

In an embodiment, the data set 300 may be represented in a matrix. For example, FIG. 3 shows a matrix 310 in accordance with an embodiment. The matrix 310, in the example shown, is formed by a series of row vectors, each row vector corresponding to a relationship of the data set 300. As shown in the example, the order of the row vectors of the matrix 310 does not have any particular significance; however, specific orderings, such as an ordering proceeding according to an index of possible relationships, and other orderings may be used.

Each column vector in the matrix 310 represents a node and, as with the row vectors, the columns need not be in any particular order, but may be. Matrix 310 comprises an entry at each intersection of a row vector and a column vector. The entries in the matrix 310 store values that encode data set 300. In an embodiment that values for the entries in matrix 310 are either zeros or ones. Although the example given shows entries having values of 0 or 1, other values, such as Boolean values of "true" and "false," or generally any set of distinguishable values may also be used in alternative embodiments.

As noted, the columns and rows of the matrix 310 may or may not be in any particular order. For instance, in an embodiment, data is extracted from one or more data stores and used to construct the matrix and the manner or order in which the matrix is constructed or extracted may dictate the matrix's initial form. For instance, in an embodiment, rows may be added to the matrix sequentially as relationships between extracted data are determined. In another embodiment, columns may be appended to the matrix as each data point is examined to determine the relationships associated with the data point.

In an embodiment, a particular row includes entries of zero or one. The relationship associated with the row may be determined by the one entries. Specifically, a column of the matrix that intersects the row at a one entry is associated with a node involved in the relationship. Likewise, a column of the matrix that intersects the row at a zero entry is associated with a node that is not involved in the relationship. Thus, counting from the top, looking at the first row of the matrix 310 which corresponds to the relationship $P_{12}$, the intersection between the A column and the $P_{12}$ row includes a zero entry thereby indicating that relationship $P_{12}$ does not involve the node A. The intersections of the $P_{12}$ row with columns J and I includes entries of one, indicating that the relationship $P_{12}$ involves I and J. In a like manner, ones or zeroes are filled in matrix 310 to represent the relationships represented by data set 300.

It should be understood that, while FIG. 3 shows a matrix representation of the data set 300, other representations can be used. For example, matrices may be constructed differently than shown in the figures. For instance, in an alternative embodiment, row vectors may correspond to nodes while column vectors may correspond to relationships. As another example, as is known, data sets stored in ontologies may be represented in a graph, a directed graph, or another representation which may encode data differently. Techniques analogous to the techniques described below, such as techniques for graph partitioning, may also be used in accordance with the present invention. Further, it should be understood that while the examples in the figures show graphical representations of specific matrices, including the entries of the matrices, matrices corresponding to data sets will typically be too large to be displayed in the same manner, but may be stored in computer memory (either volatile or non-volatile) in a manner dictated by a specific application used to create the matrices or other representations of the data.

In an embodiment, the matrix 310 is partitioned into a convenient form, for example, by using known techniques of linear algebra. For instance, the matrix 310 may be placed into block form by using elementary row operations such as swapping rows. Column operations, such as switching columns, may also be used. When row, column, or other operations are used, an index vector, list, or other mechanism that may be part of the matrix or stored in another location, may be updated to keep track of which relationships and/or nodes correspond to each vector. For example, each entry of the first row may include information (such as a string or number) identifying a particular relationship and the first entry of each column may include information identifying a particular node. In this manner, when a row or column operation is performed, the identifying information of the associated rows and/or columns are affected by the operation in a way that keeps track of the rows and/or columns. As a concrete example, if the first and second rows are switched, in an embodiment, the information identifying the first row moves to the second row and the information identifying the second row moves to the first row.

In an embodiment, partitioning a matrix includes arranging the columns such that the matrix encodes the directions of the relationships of the represented triples. Thus, the columns may be arranged such that the column corresponding to the first node in a triple is to the left of the column corresponding to the second node in the triple. Other configurations of matrices that encode the direction of the relationships may also be used, such as the inclusion of an additional encoding column that includes entries that correspond to the direction of triples included in a particular row. For instance, an additional column may be added to the matrix 310 so that the intersection of a row with the additional column includes a 0 if the order of the columns corresponds to the direction of the relationship encoded in the row and a 1 otherwise. For instance, the first row has a 1 in the intersections with the I and J columns, but the J column appears before the I column, so the order to the I and J columns does not correspond to the relationship $P_{12}$ extending between the I and J nodes. Therefore, in this example, an encoding column would have a 1 in the intersection of the first row with the encoding column to indicate that the relationship $P_{12}$ extends from I to J.

In an embodiment, with the columns arranged, the rows are arranged so that the matrix is in block form. Matrices used in accordance with the present invention will generally be sparse matrices because each row, in an embodiment, will have only two non-zero entries corresponding to the specific data represented in the row. As a result, such partitioning may be performed to form a matrix having more than one block which is convenient for visualizing and processing of the data set 300, as described more fully below.

Generally, when a matrix is used to encode data, the matrix can be partitioned into a convenient form, such as block form, using various techniques. For example, spectral partitioning can be used to partition incidence, Laplacian, or other matrices that encode a graph representative of ontological data. Likewise, multilevel coarsening and partitioning techniques, such as those that coarsen, partition, and then uncoarsen a matrix may be used. Of course, hybrid approaches of the above techniques and/or other techniques can be used as well.

It should be noted that such rearrangement of the columns may not be straight forward if a data set includes a circuit, which is a set of one or more nodes and one or more relationships arranged such that an inferred or direct relationship exists between a node and itself. For example, a circuit exists in a situation where A relates to B, B relates to C, and C relates to A, with the directions of the relationships extending from A to B, from B to C, and from C to A. With a circuit, it is not straight forward to order the columns in order to encode the directions of the relationships without taking additional measures. For instance, in the circuit described above, the C column would have to occur simultaneously before and after the A column. Nevertheless, one with ordinary skill in the art would recognize that such situations may be remedied through a variety of techniques. For example, a data set may be pre-processed to locate any circuits. If any circuits are found, triples may be removed from the data set to break any circuitous paths. For instance, the triple of C to A may be removed in the example given above so that A does not indirectly refer to itself. The removed triples may be separately processed and the results of the separate processing may be combined with results of processing the modified data set.

Figure 4:
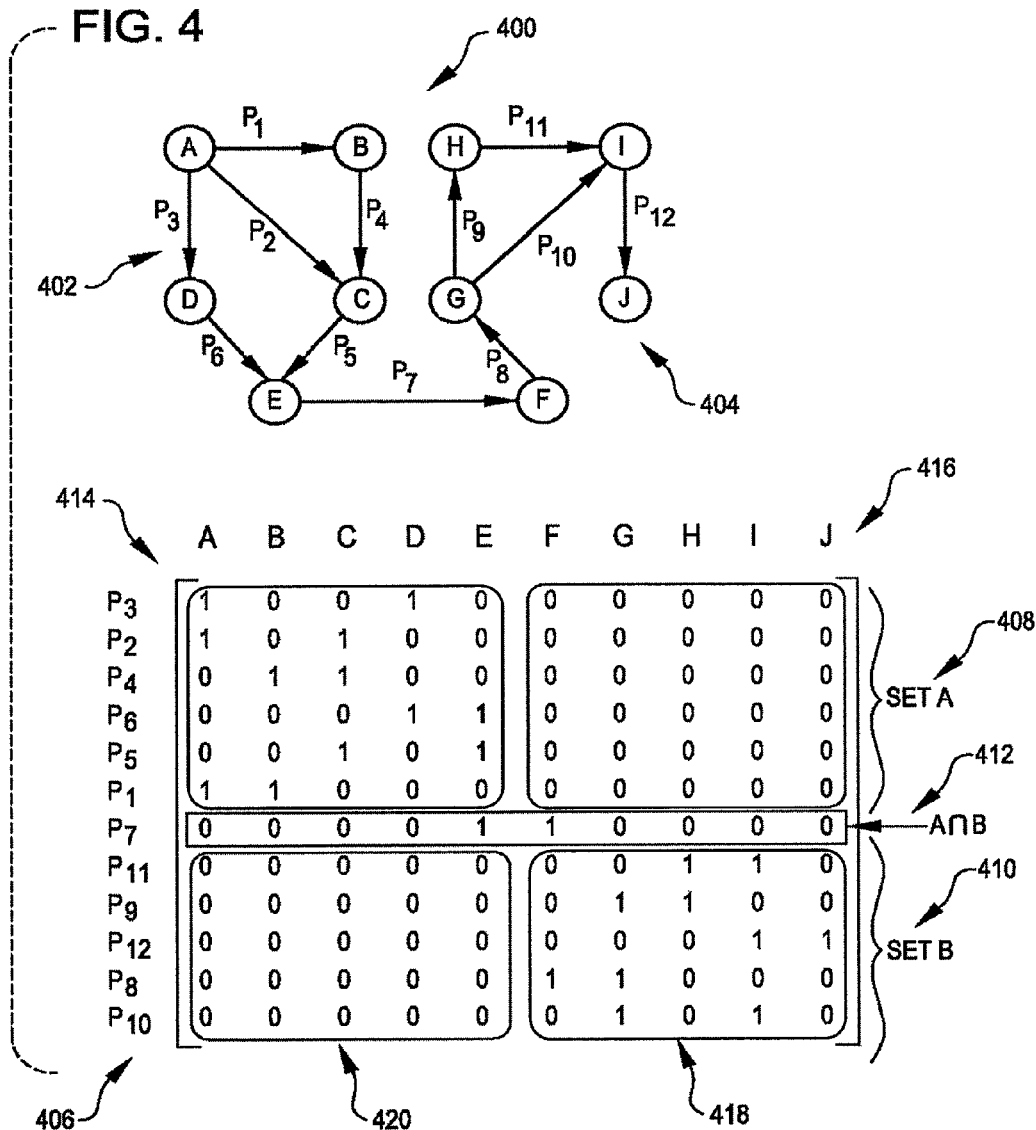
FIG. 4 shows the data set and the matrix of FIG. 3 in partitioned form.

Because the data set 300 is stored in an ontology, it can be considered as a graph, having vertices being the nodes and the relationships being edges. In an embodiment, partitioning a matrix representative of a data set can be visualized by equivalent operations on a graph representing the data set. For instance, FIG. 4 shows a representation of a graph 400 of a data set such as the data set 300, above, which shows the transitive properties of the data set. For example, if A is related to B and B is related to C, then the graph shows edges connecting B to both A and C. As shown in the example, the graph 400 includes a first subgraph 402 and a second subgraph 404. The first subgraph 402 and the second subgraph 404 are related to each other through the relationship $P_7$ connecting node E, which is in the first subgraph 402, to node F, which is in the second subgraph 404. In this manner, processing the data set 300 can be performed by separately processing data in the subgraphs and combining the results. For example, the data in the first subgraph 402 may be processed in a first processor executing instructions for a first reasoner instance, the data in the second subgraph 404 may be processed in a second processor executing instructions for another reasoner instance, which may employ the same or a different set of rules for processing than the first reasoner instance. Either the first or second (or another) processor may be used to combine the results according to the relationship $P_7$.

It should be understood that data sets will vary and, as a result, decomposition of a graph representing a data set will vary accordingly. For instance, a graph may be partitioned into subgraphs that are disconnected, or may be partitioned into subgraphs that are connected to one another by more than one edge. In addition, a typical data set, in accordance with an embodiment, will be partitioned into more than two subgraphs which may be processed separately. Further, data in some subgraphs may be processed in one processor, while data in other subgraphs may be processed in another processer or processors.

Turning to the matrix representation, FIG. 4 also shows a matrix 412 which has been partitioned into a convenient form. For example, the matrix 412 in an embodiment is a matrix resulting from the transformation of the matrix 310, described above. As described above, the columns of the unpartitioned matrix 310 have been rearranged such that they encode the direction of the relationships between the nodes. In an embodiment, if a relationship extends from a first node to a second node, then the column associated with the first node is placed before the column associated with the second node. For example, because the relationship $P_1$ extends between A and B, the A column is placed before the B column.

Further, the rows of the matrix 412 have been arranged so as to put the matrix in block form which, as described below, results in partitioning the data into separately processable partitions. As discussed above, many different techniques for partitioning matrices into block form may be used in accordance with various embodiments. As shown, the matrix 412 includes a first vector set 408 (SET A) comprising the upper seven rows of vectors and a second vector set 410 (SET B) comprising the lower six rows of vectors, where the first vector set 408 is above the second vector set 410. An intersection vector set 412 comprises the row vectors that are common to both the first vector set 408 and second vector set 410. As discussed, the matrix and sub matrices of FIG. 4 are provided for the purposes of illustration and, generally, matrices used in accordance with various embodiments may have vector sets and sub matrices having different characteristics, such as more or less rows.

As shown in the example, the first vector set 408 includes a first submatrix 414 in the upper left corner that comprises entries that are either zero or one and a first zero matrix 416 in the upper left corner that comprises entries that are all zero. In an embodiment, the first submatrix 414 is situated to the left of the first zero matrix 416. Likewise, the second vector set 410 includes a second submatrix 418 and a second zero matrix 420 where the second submatrix 418 sits to the right of the second zero matrix 420 and the second submatrix 418 includes entries being zero or one and the second zero matrix 420 having entries all zero. In this manner, it can be seen that the partitioned matrix 406 is partitioned into discreet blocks and may include a vector connecting the blocks. While the partitioned matrix 406 is composed of four block matrices and the intersection vector 412, it should be understood that data sets, in general, in accordance with an embodiment, will be partitioned into a larger or smaller number of blocks which may or may not be separated by non-zero intersection row vectors. In addition, it should be understood that the particular positioning of the blocks of the matrix 406 is made according to mathematical convention with the blocks located along a main diagonal of the matrix 406, but that other configurations are possible.

Returning to the example in the drawing, the first submatrix 414 encodes the first subgraph 402 while the second submatrix 418 encodes the second subgraph 404 in the manner described above. The intersection vector encodes the relationship between the first subgraph 402 and the second subgraph 404. If a graph of a data set includes two disconnected subgraphs, a partitioned matrix representation may not include any intersection vectors between blocks representing the disconnected subgraphs. In addition, one or more row vectors of all zero entries may be situated between blocks representing disconnected subgraphs.

In an embodiment, a map function and a reduce function are employed in order to distribute the reasoning of an ontology among various processors and to combine the results of the distributed reasoning. Reasoning an ontology may include application of a predefined set of rules to the data of the ontology. As an example, a commonly used rule in reasoning ontologies is the transitive rule where, if node A relates to node B and node B relates to node C, then node A relates to node C. Other rules, depending on specific applications, may be used in addition to or in place of the transitive rule. In an embodiment, the map function takes as input data corresponding to a subgraph of a graph representing an ontology and a set of rules to be used by a reasoner to process the individual triples represented in the subgraph. For a subgraph and set of rules input to the map function, the output of the map function includes data corresponding to a subgraph (typically a different subgraph) and an inferred vector which may encode information about one or more triples. In an embodiment, the subgraphs output by the map function may include nodes that are common to more than one subgraph so as to encode any relationships between subgraphs.

FIG. 5 shows a specific example of matrices resulting from a map function that can be used in accordance with an embodiment. Specifically, FIG. 5 shows a first vector set 500 and a second vector set 502 in accordance with an embodiment. In an embodiment, the first vector set 500 encodes the first vector set 408 and intersection vector 412 described above in connection with FIG. 4. Referring back to FIG. 4, the first vector set 500 encodes the first subgraph 402 and the triple including nodes E and F, and the relationship $P_7$ extending between E and F. In this manner, the first vector set 500 encodes the first subgraph 402 and the triple connecting the first subgraph 402 to the second subgraph 404. In an embodiment, the first vector set 500 encodes the first subgraph 402 and triple including E, F, and $P_7$ in a manner similar to that described in connection with FIGS. 3 and 4.

Similarly, the second vector set 502 encodes the second vector set 410 and the intersection vector 412 described above in connection with FIG. 4, thereby encoding the second subgraph and the triple represented by E, F, and $P_7$. As shown in FIG. 5, in an embodiment, the row vectors of the first set of vectors 500 are simply the row vectors of the first data set 408 and intersection vector 412. In this manner, the map function outputs the first vector set 500 and second vector set 502. Subgraphs corresponding to the first vector set 500 and second vector set 502 may be ascertained from the entries in the vector sets, as described above. In an embodiment, the first vector set 500 forms a first matrix 504 which may be in block form and whose columns and rows represent nodes and relationships, respectively, as described above.

As noted above, the map function also outputs inferred vectors which may encode the relationship between two or more nodes as determined by a reasoner. For example, a set of rules may include a transitive rule for an ontology which provides, for example, that if A is related to B and B is related to C then A is related to C. The set of rules may also include information identifying which rows should be considered when implementing the transitive rule. The transitive rule in processing of ontologies is convenient because when matrix representations are used, as described above, processing the transitive rule on a subgraph can be performed using an OR operation of the relevant rows which is computationally efficient. In an embodiment, an OR operation on a plurality of rows is performed by performing an OR operation on corresponding entries in the rows. For example, if the third entry of one row is a zero and the third entry of another row is zero, an OR operation performed on the two rows will have a zero in the third entry. If the third entry of both rows is a one, then an OR operation performed on the two rows will have a zero in the third entry. If one of the rows has a one in the third entry and the other row has a zero in the third entry, then the result of an OR operation performed on the two rows will have a one in the third entry.

In an embodiment, the inferred vectors form a set of inferred vectors whose columns and rows encode triples as described above. For example, a first inferred vector set 506 results from processing the first vector set 500 according to a plurality of user-selected or predefined rules of a reasoner. Likewise, a second inferred vector set 510 results from processing the second vector set 502. In the example shown, the first row of the first inferred vector set 506 is a result of performing an OR operation on the rows $P_1$, $P_4$, $P_6$ and $P_7$ of the first submatrix 504. This particular operation, for instance, may be chosen by a user of the reasoner and any suitable operation or operations may be used. Likewise, the remaining rows of the inferred vector set 506 are formed using various OR operations on various rows of the first submatrix 504 depending on the particular rules chosen by the user. Generally, the type of operations used to make inferred vector sets will vary depending on specific applications and reasoners and it should be understood that the particular operations used to form the inferred vector sets are chosen merely as an example.

In an embodiment, a reduce function is constructed or provided whose input includes information about subgraphs and inferred triples from each subgraph. For example, the input of the reduce function may include a list of nodes directly related to nodes of the subgraph. Thus, the input of the reduce function may include all the nodes of the subgraph as well as one or more nodes of another subgraph related to the input subgraph by a relationship. For example, in reference to the first subgraph 402 and second subgraph 404 shown in FIG. 4, the input of the reduce function may include the list {{A, B, C, D, E, F}, {F, G, H, I, J}}. In this example, the nodes A, B, C, D, E, and F are from the first subgraph 402 and the nodes F, G, H, I, and J are from the second subgraph 404. The node F is included in both lists because it is the node in the second subgraph 404 to which the first subgraph 402 refers through the relationship $P_7$. The input of the reduce function may also include a list of inferred triples within the subgraphs, such as a triple including nodes A and E.

The reduce function determines, based upon the input, whether additional reasoning should take place. For instance, referring to the same example, because the first subgraph 402 and second subgraph 404 are related to each other by the relationship $P_7$, the reduce function then takes the inferred triples from each subgraph and applies the rules of the reasoner to the inferred triples input to the function and returns a list of inferences. For complicated data sets, the reduce function may be applied repeatedly or recursively to ensure that desirable inferences are identified. Thus, for example, the output of the reduce function may include an inferred triple that includes the nodes A (from the first subgraph 402) and J (from the second subgraph 404), because A and J are indirectly related to one another through a series of relationships.

FIG. 6 shows an example of the output of a reduce function using the input from the example shown in FIG. 5. In particular, FIG. 6 shows a matrix 600 (inference library) whose columns correspond to nodes and whose rows correspond to inferred triples. The inferred triples may be, for example, a result of applying a reasoner to the first inferred vector set 506 and second inferred vector set 510 of FIG. 5. As a specific example, the first row of the matrix 600 shows an inference from A to J because there is a 1 in the intersection of the A and J columns with the first row. The first row also shows the nodes involved in an inference from A to J. For instance, the intersection of the B, C, E, F, G, I columns with the first row includes a 1 while the intersection of the D and H columns includes a 0. As a result, the matrix 600 encodes information indicating that an inference from A to J may include a path extending through nodes B, C, E, F, G, and I. Likewise, the fourth row of matrix 600 encodes another inference from A to J that may include a path extending through nodes C, D, E, F, G, and I.

FIG. 8 demonstrates how embodiments of the disclosed invention allow for efficient handling of new, deleted, and/or modified data. In an embodiment, an ontology 802 representing a data set is partitioned into a plurality of subontologies, represented in the figure by $SO_1$ through $SO_n$. When a piece of data of the data set is modified, one or more triples of an ontology representing the data set change when the ontology is updated. For instance, FIG. 8 shows a vector 804 representative of a triple changed because of a change in a corresponding data point. Because of the partitioning of the ontology in accordance with embodiments of the present invention, it is possible to map the changed vector to only those subontologies affected by the change. For example, the changed vector may be mapped to a single subontology, a subset of the subontologies, or all subontologies. Because the vector is mapped to only the affected subontology or subontologies, updating the ontology may involve only updating the affected ontologies. An inference library 806, such as the inference library represented by the matrix 600. described above in connection with FIG. 6, may be updated, for example by using MapReduce techniques, by updating only the portions of the reference library affected by a change in affected ontologies instead of updating the complete reference library. Further, when multiple vectors representing triples change, the vectors can be likewise mapped to affected subontologies and updating the entire ontology can then be spread over a plurality of processors. Thus, the amount of resources spent updating an ontology based on changed data may be significantly reduced.

Figure 9:
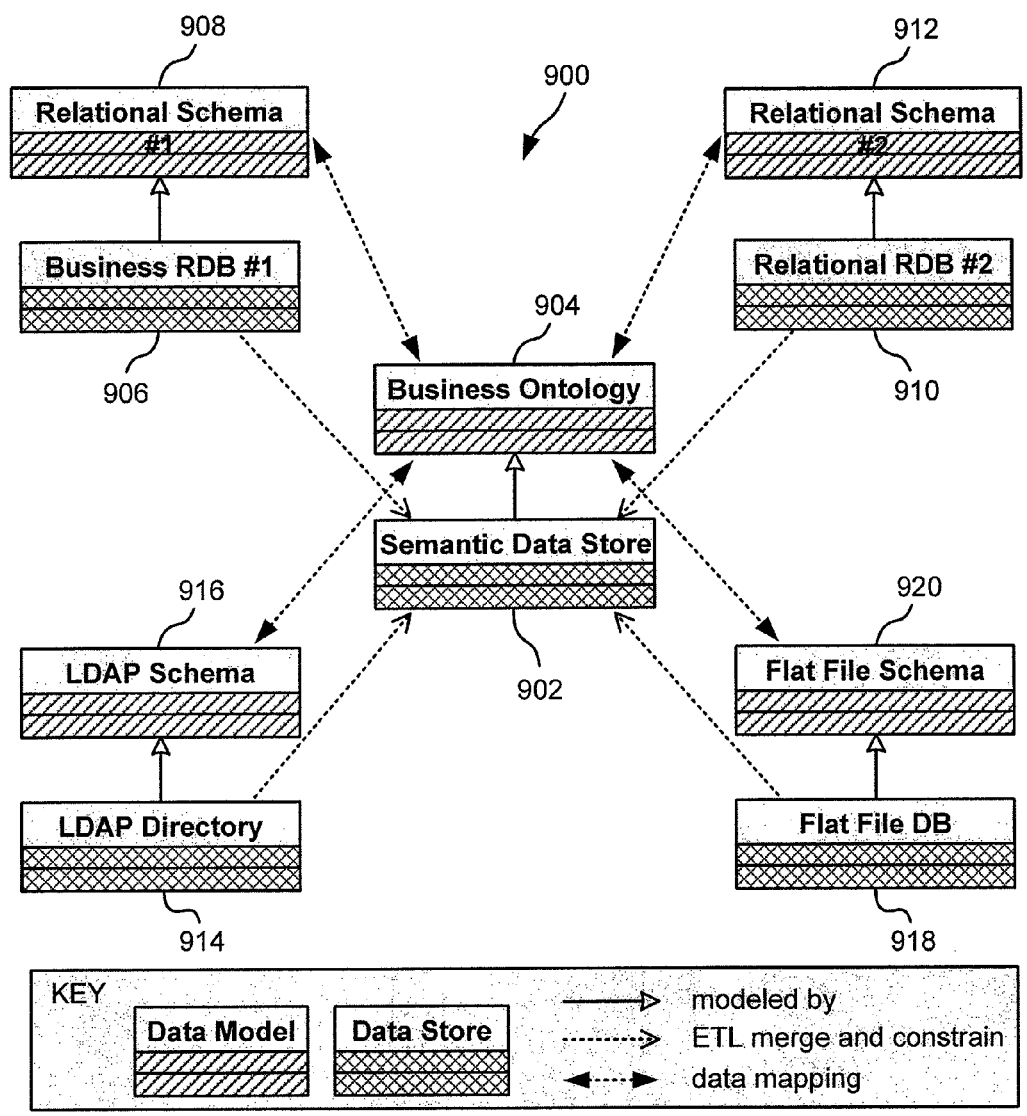
FIG. 9 shows a diagrammatic representation of a logical architecture of a semantic data store, in accordance with an embodiment.

FIG. 9 shows a general representation of an architecture for extracting semantic data from various sources in accordance with an embodiment. The architecture 900, in an embodiment, includes a semantic data store 902 which is modeled by a business ontology 904 according to declarative data mappings, as described in more detail below. Generally, in an embodiment, the business ontology 904 is a representation of semantic concepts from the semantic data store 902 and the relationships between those concepts. Also, in an embodiment, the semantic data store 902 may be realized using the W3C OWL-DL ontology language. It should be understood that, while the present disclosure refers to various concepts within a business domain, the present invention is applicable to any domain that is associated with one or more organizations that store data as part of their operations. Therefore, while the following description refers to a business, the present invention may be applicable to any organization.

In the example of FIG. 9, four different data sources of a business are shown, although a business or other entity may use more than four data sources or less than four. Also, the four different data sources may be physically realized in separate data stores, which may be in separate geographical locations, or two or more data sources may be incorporated into a single data store. As shown in the example demonstrated in FIG. 9, a business may include a first relational database 906 which is modeled by a first relational schema 908. As it applies to data storage, a schema is a structure configured to organize the data of one or more data sources. For example, in a relational database, a schema that models the relational database defines the tables of the database, the fields of each table, and the relationships between the fields and tables.

In the provided example, the business may also include a second relational database 910 which is modeled by a second relational schema 912. There can be various reasons for having more than one source of business data, for example for storing data for different aspects of a businesses' activities, such as sales and human resources. Businesses may also store data in different forms depending on the particular application. For example, in FIG. 9 a light weight directory access protocol (LDAP) directory 914 is modeled by a LDAP schema 916. Likewise, a flat file database 918 may be modeled by a flat file schema 920. Thus, in the example shown in FIG. 9, a business may include data from a variety of sources in a variety of formats.

As can be seen in the figure, data from each of the data sources is mapped to the semantic data store 902. In an embodiment, mapping data from a data source to the semantic data store 902 is described in more detail below, but generally includes extracting data from the source and loading it (or a portion of it) into the semantic data store, which may or may not involve reformatting data from one form to a form suitable for the semantic data store 902. In addition, mapping data from a data source to the semantic data store 902 may involve mapping all data from the data source or using a filter to only map some data from the data source. For instance, the data source may include data that is not pertinent to the purposes for which the business ontology 904 is used and, as a result, only pertinent data would be mapped to the semantic data store. A filter may be used to control which data is mapped to the semantic data store. For example, the data mappings above can be used in connection with Oracle Data Integration (ODI) Tools available from Oracle International Corporation in order to perform ETL processes that constrain and filter data from the various data stores and merge the data into a common format in the semantic data store 902. As described below, once maps are constructed, the maps can be used in automated processes that extract data from one data store and appropriately load the data into the semantic data store 902. Extraction and loading of data can occur, for example, at predetermined intervals such as once a day, or at predetermined triggers, such as when data is changed.

As shown in the example, data from the first relational database 906 is stored in the semantic data store 902 as well as data from the second relational database 910, the LDAP Directory 914, and the flat file database 918. In an embodiment, schemas of various data stores are mapped to the business ontology such that semantic concepts embodied in the data stores are stored in the business ontology 904. For example, the first relational database 906 may include a plurality of tables, each table having one or more columns. The first relational schema 908 may relate tables together in a useful manner, for example, relating customers to invoices such that a customer is related to an invoice for goods or services purchased by the customer. Thus, relationships defined by the relational schema 908 are mapped to the business ontology 904 such that semantic concepts defined by the relational schema 908 are preserved in the business ontology 904.

Figure 10:
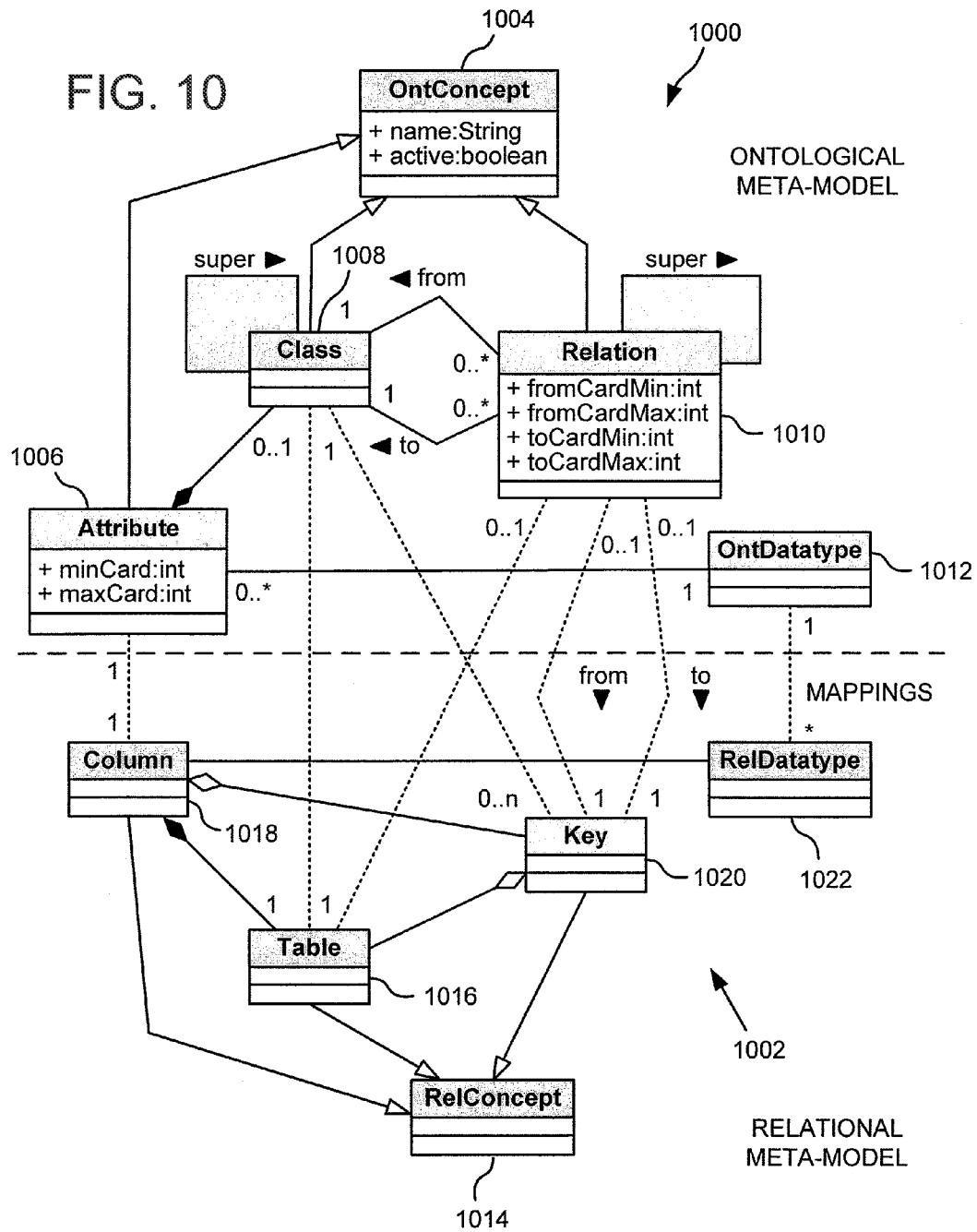
FIG. 10 shows a diagrammatic representation of mappings between ontological and relational meta-models that may be used with the architecture of FIG. 10, in accordance with an embodiment.

FIG. 10 shows an ontological meta-model 1000 which, in an embodiment, provides an implementation for the architecture described in connection with FIG. 9 and to which a relational meta-model 1002 is mapped. The example given in FIG. 10 may be useful, for example, for mapping data from a relational database to the ontological meta-model 1000 although it will be understood by those with ordinary skill in the art that various data stores and corresponding data schemas may have different properties than what is shown. In an embodiment, the ontological meta-model 1000 comprises a plurality of ontological storage containers which includes a container for ontological concepts 1004, which is a super class of attributes 1006 class, classes 1008 class, and relations 1010 class. In other words, attributes 1006, classes 1008, and relations 1010 are all types of ontological concepts. In an embodiment, each class 1008 is a collection of one or more entities or instances, such as employees, and each attribute 1006 is a collection of one or more data-type property of a class, such as a first name. As noted above, the classes can have super classes. For example a member of an Employee class may be a member of a Manager class as well.

Also, in an embodiment, each relation 1010 is a binary relationship between two classes. For example, a relation orgHasEmployees may be a relationship between a member of an organization class and an employee class. This relationship, for example, may specify employees that are part of an organization. Relations 1010 may be further classified in terms of their domains (the class or classes from which they relate) and ranges (the class or classes to which they relate). Also, in an embodiment, some relations 1010 have super relations. For instance orgHasEmployees may be a super relation of an orgHasManagers relation because, for example, all managers may be employees.

As shown in the diagram, the ontological meta model 1000 also includes storage for ontological data types 1012, which may be, for example, strings, integers, floats, dates, Boolean, or other types of data. In an embodiment, datatypes are the ranges (value sets) of the attributes and consist of sets of similar data forms. In the embodiment presented in the drawings, ontological type data is stored separately from instance data, which is stored in a hyper-denormalized relationed form. As used herein, semantic data that is in hyper-denormalized raltioned form is stored such that every attribute is stored in its own table. This form provides an advantage in that instance data is easily and quickly accessible, which in turn allows for a highly distributed approach to solve problems of inferencing, persistence, and other issues. In other words, the architecture in the disclosed embodiment provides the power and flexibility of ontological storage with the performance of modern relational database management system. However, one with skill in the art will appreciate that variations are possible and that, in other contexts, different architecture may be appropriate. For example, one with skill in the art would recognize that type and instance data may be stored in the same storage system and that instance data need not be hyper-denormalized, but that different degrees of denormalization of data may be used, and different kinds of instance data may be combined in one or more containers.

As shown in the drawing, in an embodiment, between the classes are relations 1010 between the classes 1008 and there may be relations 1010 among the relations 1010. Also, each class 1008 is an aggregation of attributes, in accordance with an embodiment.

As noted above, the relational meta-model 1002 is mapped to the ontological meta-model, as described more fully below. In an embodiment, of relational meta-model includes relational concepts 1014 which are super classes of tables 1016, columns 1018 and keys 1020. Also, as is known, each table 1016 is an aggregation of columns. As can be seen, various mappings are provided between various elements of the ontological meta-model 1000 in relational meta-model 1002. For instance, in an embodiment, one or more columns of a table are mapped to an attribute of the ontological meta-model 1000. Likewise, tables 1016 are mapped to classes 1008 of the ontological meta-model 1000. As keys 1020 define relationships between tables 1016 in the relational meta-model, keys of the relational meta-model 1002 are mapped to relations of the ontological meta-model 1010 in a manner preserving the relationships between the tables 1016. In an embodiment, relational data types 1022 are mapped to a ontological data types 1012.

In an embodiment, the relational meta-model may be implemented using a relational database management system (RDBMS) and the meta-data in the relational meta-model is, therefore, readily available. The mapping shown in FIG. 10, in an embodiment, may also be achieved by utilizing Application Programming Interfaces (APIs) exposed by the systems implementing the relational meta-model 1002, such as Java Database Connectivity (JDBC) meta-data, Open Database Connectivity (ODBC) meta-data, and the like.

Figure 11:
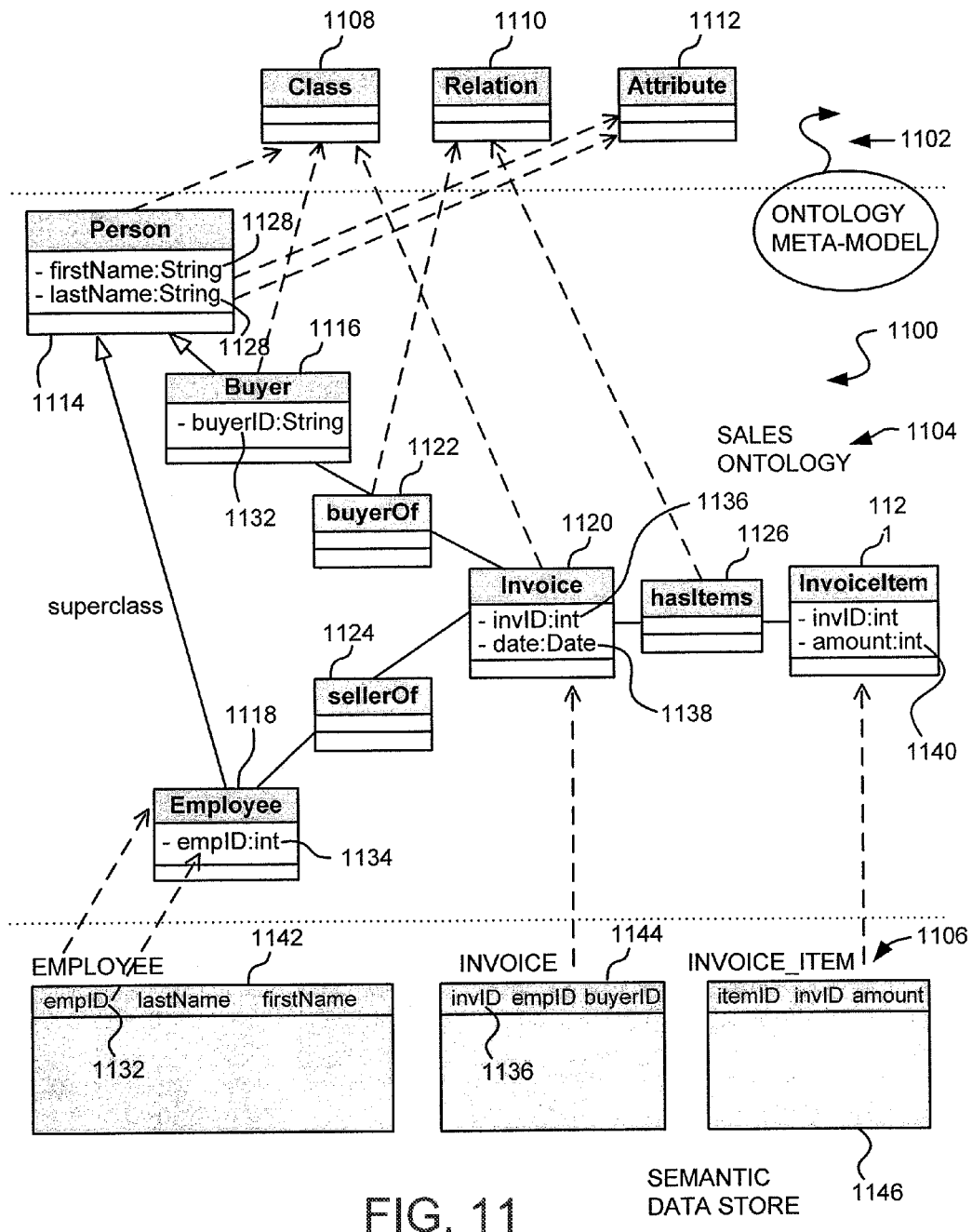
FIG. 11 shows a diagrammatic representation of a semantic data store and the relationships between the semantic data store, an ontology, and an ontological meta-model, where the semantic data store may be created using the mappings of FIG. 11.

FIG. 11 shows an example fragment 1100 from a sales ontology data store that provides an illustrative example how an ontology meta model 1102, sales ontology 1104, and semantic data store 1106 may relate, in accordance with an embodiment. In an embodiment, the semantic data store 1106 is used to store and maintain the instance data that is modeled by one or more ontologies and that has been imported, filtered, and merged from the business data sources, such as those described above in connection with FIG. 9. In an embodiment, in order to reason over transactional data with high performance, the semantic data store 1106 is formatted as a hyper-denormalized and vertically partitioned system. For example, data derived from n columns of an RDBMS table, in an embodiment, would be stored as n tables in the semantic data store 1106.

In an embodiment, the semantic data store translates policies (queries) expressed in terms of the sales ontology 1104 into queries expressed in terms of the semantic store schema, and executing the translated queries on the data store. The actual execution of the query may be delegated to a reasoner. Thus, in an embodiment, a query expressed in terms of classes and relations will be translated by the semantic data store 1106 in terms of tables and keys. For example, in an embodiment, the ontological query:

ONT: SELECT X.firstName, X.lastName will get translated into the semantic data source query:

SELECT firstName, lastName FROM Partition 1, Partition 2, . . . , Partition N.

In addition, appropriate relations may be substituted with foreign-key/primary-key pairings when the query is translated into the relational form.

As discussed above, the ontological meta-model is comprises of classes 1108, relations 1110 and attributes 1112. The sales ontology 1104 comprises specific instances of the members of the ontology meta-model 1102. For example, as shown, the sales ontology 1104 includes several classes including a person class 1114, a buyer class 1116 an employee class 1118, an invoice class 1120 and invoice item class 1121. As seen by it's name, the person class 1114 corresponds to people such as employees, buyers and other people. Accordingly, the buyer class 1116 and employee class 1118 are sub-classes of the person class 1114. Also clear from its name, the invoice class 1120 may be associated with invoices and the invoice item class 1121 may be comprised of various invoice items such as various products sold by a business employing the disclosed ontology. In an embodiment, the employee class 1118, invoice class 1120, and invoice item class 1121 have corresponding tables in the semantic data store 1106. Other classes of the sales ontology 1104 may also have corresponding tables in the semantic data store 1106.

As shown, the sales ontology 1104 includes various relations from the relations 1110, such as a buyerOf relation 1122 and a sellerOf relation 1124 and a hasItems relation 1126. The names of the various relations also may be related to their semantic meaning. For instance, as can be seen in the figure, a buyer of the buyer class 1116 may be related to an invoice of the invoice class 1120 by the relation buyerOf because the buyer may have purchased the particular items of the invoice. Likewise, an invoice of the invoice class 1120 is related to invoice items of the invoice item class 1121 by the relation hasItems 1126 because the invoice items were included on the invoice. Also, the sellerOf relation 1124 relates an employee of the employee class 1118 to an invoice of the invoice class 1120 when the employee was the person who sold the items listed on the invoice. In an embodiment, relations 1110 are represented in the semantic data store 1106 by the pairing of the primary key of the tables of the semantic data store 1106, as discussed below.

Further, various items of the sales ontology 1104 may include various members of the attribute class 1112. As an example, person 1114 may include a first name 1128 and a last name 1130, which, as indicated in the drawing, may be stored as strings. Likewise, a buyer 1116 may have a buyerID unique to the buyer as may an employee 1118 have an employeeID 1134 unique to the employee. Continuing this example, the invoice 1120 may include an invoiceID 1136 unique to the invoice 1120 and a date 1138, for example, on which the invoice 1120 was created. As a final example, an invoice item of the invoiceItem class 1121 may include an amount corresponding to the price at which the associated item was sold to the buyer 1116.

As discussed above, various items of the sales ontology are stored in a semantic data store 1106. In an embodiment, the semantic data store 1106 may closely resemble a data store of another data model such as a relational database model. Thus, in an embodiment, the semantic data store 1106 includes a plurality of tables where each table corresponds to a class of the ontology meta-model 1102. It should be understood, however, that the example semantic data store 1106 shown in the drawings may be in an intermediate format used to facilitate transformation of the data. Data from the semantic data store 1106 may be further transformed, for example, into a format suitable for use with a particular reasoner operable to reason the data.

Thus, as shown in the illustrative example of FIG. 11, the semantic data store 1106 includes an employee table 1142, an invoice table 1144 and an invoice item table 1146. Each of the tables of the semantic data store 1106 may include a key comprising an attribute unique to the entities represented by the table. For instance, the employee table 1142 may include a column having each employee ID 1132. Other attributes may also be stored in tables such as the last name and first name attributes of employees in the employee table 1142. Likewise, the invoice table 1144 may include a column corresponding to an invoice ID primary key, employee ID foreign key and buyer ID foreign key such that in this manner, for example, an ID of an invoice may be located in the invoice table 1144 and the employee associated with the invoice and buyer to which items on the invoice are sold may be identified.

Figure 12:
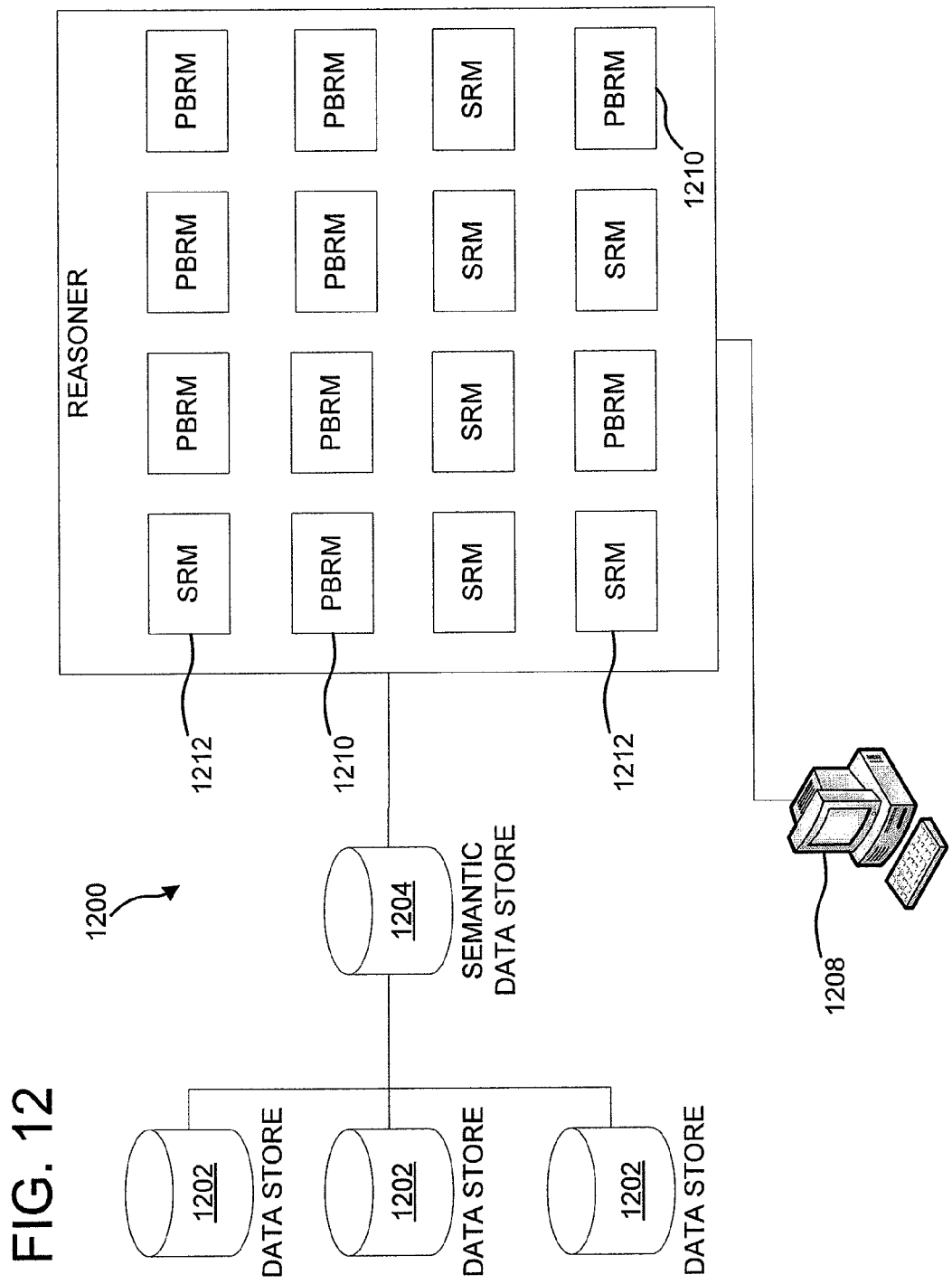
FIG. 12 shows a diagrammatic representation of a modular reasoning system in accordance with an embodiment.

The above embodiments, and variations thereof, provide include features additional to those discussed above. FIG. 12 shows an embodiment 1200 of an environment in which embodiments of the invention may be practiced. As shown, the environment 12 includes a plurality of data stores 1202 from which data is extracted and stored in a semantic data store 1204, such as in a manner described above. In an embodiment, data stored in the semantic data store 1204 is reasoned by a reasoner 1206, which is operated by a user of a user terminal 1208, in accordance with an embodiment. While FIG. 12 shows the reasoner 1206 analyzing data from a single semantic data store 1204, the reasoner 1206 may utilize data from multiple semantic data stores as well as from one or more of the data stores 1202, or data from other sources. Generally, the semantic data store 1204 is a data store whose persistence mechanism can be the file system, database, or memory, depending on the usage within the application and, as described above, may be dynamically optimized for storage of data based on deployed semantic domain definitions. As described above, semantic domain definitions may be OWL files that encapsulate domain taxonomy, which may be defined by a business expert, for a particular domain.

In addition, it should be noted that FIG. 12 shows a simplified environment for the purposes of illustration, but that actual implementations may utilize various components in addition to that which is illustrated and, in various embodiments, certain components are omitted. For example, in an embodiment, the reasoner 1206 is implemented in one of several layers of a software architecture adapted for enforcing policies. As an example, an interface, such as a Web 2.0 interface, may be provided for users to utilize various components. Customized interfaces for utilizing various components may be created using REST Web Services or services using other protocols, such as SOAP. One or more interfaces may be used to operate application services which coordinate components of policy enforcement, such as a policy engine that operates the reasoner 1206 and the semantic data store 1204, data services that coordinate the transfer of data to the semantic data store 1204, and report services that provide reporting documents based on analysis of data in the semantic data store 1204, and the like. In an embodiment, the data services utilize Oracle Data Integrator 11gR1 and the report services utilize Oracle Business Intelligence Publisher, both available from Oracle Corporation.

As shown in the drawing, the reasoner 1206 comprises a plurality of reasoning modules, where each reasoning module is configured to apply a set of rules to analyze data in the semantic data store 1204. While FIG. 12 shows a certain number of reasoning modules of the reasoner 1206, the reasoner 1206 may have more or less reasoning modules. When reasoning data, the reasoner may use all or some of its reasoning modules, depending on the type of reasoning being conducted. For instance, a user may, through an input device, define a particular analysis that the user would like to perform, and the reasoner may use one or more applicable modules, such as in a manner described below. Further, a user may define his or her own reasoning modules, which may include a combination of some of the reasoning modules of the reasoner 1206 directed to analyze data in a particular manner.

In an embodiment, the reasoner includes one or more pattern based reasoning modules 1210 (abbreviated as PBRM) and one or more semantic reasoning modules 1212 (abbreviated as SRM). In an embodiment, a PBRM 1210 is a sub-reasoner of the reasoner 1206 that uses a predefined process for performing statistical analysis on data from the semantic data store in order to infer information from the data. PBRMs may utilize range reasoning where data is looked at over a specified range, such as over a specified time period. As an example, utilizing a matrix-based approach, such as the approach described above, a covariance matrix of a vector may be constructed in order to measure how the changes of variables in the vector depend on others. Likewise, the covariance of two variables may be measured for other objects, such as matrices or higher-dimensional objects. Correlation between two seemingly random variables, such as between invoice amounts and payments unrelated to the invoices, may signify fraud. A PBRM may take as input a set of data, such as a sampling of numerical values (such as invoice line items) over a time period, and may output conclusions based on a statistical analysis of the numerical values, such as covariance matrices or other objects.

Other statistical techniques may be used in PBRMs. For instance, pattern recognition may be used to identify activities that are out of the ordinary. As an example, certain invoices, payments, and or other items may be flagged for review if they contain an amount that is above or below a predefined threshold. As another example, pattern recognition techniques may be used to flag invoices, payments, or other items that are not necessarily above or below a threshold, but that are otherwise abnormal, such as invoice amounts that are larger or smaller than usual, but not outside of a range that would cause any flags to be set. Pattern recognition may also be used to compare activity with activity of those having similar duties. For instance, pattern recognition may be used to identify, through analysis of purchases and/or other data, that a manager of a location is replacing parts on equipment more frequently than managers of other locations. An investigation may be subsequently made to determine whether the manager is legitimately acting differently from his or her peers, whether corrective action needs to be taken, and/or whether fraud is being committed, such as by profiting off the sale of used parts.

Generally, techniques that may be employed in PBRMs include: cross-correlation analysis to discover the relationship between multiple dependent variables; Bayesian filters to look at past events and build probabilistic models to predict future events to detect whether past, present, and/or future events violate a policy; and wavelets for detection of data that is most likely to be suspect. Other techniques may also be used and, as new techniques are developed, a user may define reasoning modules that are able to apply any given technique. For instance, in an embodiment, users may define techniques that may be employed by a PBRM using combinations of the above techniques and/or defining additional techniques.

One or more SRMs 1212 may be used in connection with one or more PBRMs in order to increase the effectiveness of the modules. In an embodiment, an SRM is a reasoning module that applies one or more rules to a set of data, which may be put into matrix form, as described above, in order to provide information about the relationships among the various data. For instance, a semantic reasoning module may identify all invoices related to a particular employee. Generally, use of SRMs and PBRMs provides increased flexibility in choosing the data to be analyzed and the techniques to be used for analysis. For instance, output of one or more SRMs may be used as input for one or more PBRMs. As an example, if John Doe is an employee, a SRM may be used to identify invoices issued by John Doe, such as using any of the techniques, or variations thereof, discussed above. One or more covariance techniques may be used by one or more PBRMs to determine whether there is a correlation between the invoice amounts and other data, such as data not associated with John Doe. An SRM may be used to exclude data from the analysis that typically would be correlated to the invoice amounts, such as payments to the vendors identified on the invoices. An SRM may take input objects from the semantic data store, may construct appropriate matrices, and may perform matrix operations on the matrices depending on the nature of the reasoning being performed, although matrices may be input into SRMs in other embodiments. Output from an SRM may be a set of inferences, or other conclusions, about the relationship among semantic data, or may be a set of numerical values (such as invoice line items), or other data.

Likewise, the output of one or more PBRMs may be used as input to one or more SRMs. For instance, as discussed, PBRMs may be used to find correlations among various data. A SRM may be used to provide useful information about data having correlations, such as people, roles, vendors, and others associated with a particular datum. This information may be viewed by an analyst who may decide whether to investigate further and/or take corrective action. Additionally, the information may be used in order to define rules for additional analysis. The reasoner 1206 may include additional logic to coordinate the flow of data among reasoning modules being used, such as by formatting output of one reasoning module into a format suitable as input for another reasoning module. For instance, if an SRM outputs a set of inferences, the reasoner 1206 may extract from a semantic data store objects (such as numerical values corresponding to objects associated with the inferences) and provide those values to a PBRM for processing by the PBRM.

As discussed in the preceding paragraphs, SRMs and PBRMs may be used in series (where output of one or more modules is used as input for one or more other modules). SRMs and PBRMs may also be used in parallel in appropriate circumstances. For instance, output of an SRM and output of a PBRM may together be used as input for one or more other modules, each of which may be an SRM or PBRM. Additionally, while the above discussion pertains to SRMs and PBRMs, other types of modules may be employed. In an embodiment, one or more hybrid modules may be used in ways discussed above, where a hybrid module is a reasoning module that employs both semantic reasoning (such as transitive reasoning of semantic data) and statistical reasoning (such as pattern-based reasoning of numerical data). A hybrid module may comprise a combination of one or more SRMs and/or PBRMs in series and/or parallel.

Figure 13:
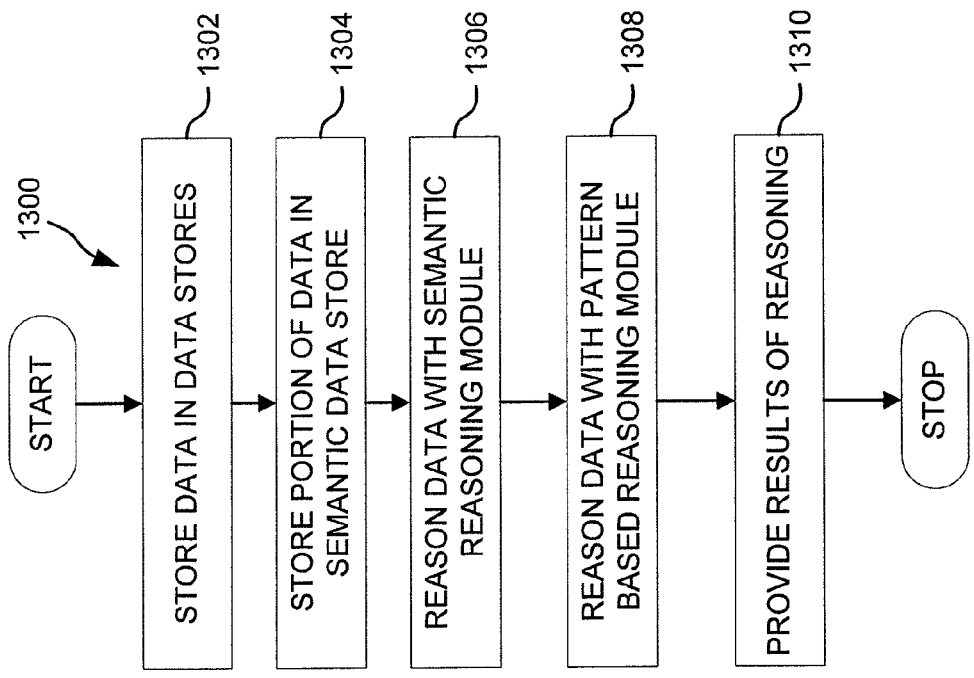
FIG. 13 shows a method for modularly reasoning data in accordance with an embodiment.

FIG. 13 illustrates steps of a method 1300 for reasoning data, in accordance with an embodiment. As with any method disclosed herein, or variations and/or combinations thereof, the method 1300 may be performed under the control of one or more computer systems configured with executable instructions. The executable instructions may be embodied on a computer-readable medium. In an embodiment, at a data storage step 1302, data is stored in one or more data stores, such as during normal operations of an organization, as described above. As noted above, data may be stored in a plurality of data stores that utilize various methods of storing data, such as methods for storing data in a relational database, in flat files, and the like.

In accordance with an embodiment, at a semantic data storage step 1304, at least a portion of the data stored in the one or more data stores is stored in a semantic data store, such as a semantic data store configured as described above. As discussed, storing data in the semantic data store may involve the use of various filters in order to exclude some data from the one or more data stores and also may involve the use of various transformations of the data that put the data in a form suitable for storage in the semantic data store, such as in a manner described above. In addition, while the method 1304 describes a single semantic data store, more than one semantic data store may be utilized.

At a semantic reasoning step 1306, in an embodiment, data from the semantic data store is reasoned using a SRM, where the SRM may be as described above. For instance, a SRM may apply transitive reasoning to data in the semantic data store in order to identify relationships specified by a user of a system employing the method 1300, such as all invoices associated with a particular employee and/or having particular attributes. Semantic reasoning may include construction of one or more matrices or other objects whose entries signify something in the data, such as an amount, or a 0 or 1 as described above. Once the matrix or matrices are constructed, semantic reasoning may include applying matrix operations and/or other analysis to the matrices, depending on the particular type of reasoning being performed. At a statistical reasoning step 1308, data from the semantic data store is reasoned using a PBRM, in accordance with an embodiment. For instance, a PBRM may apply statistical reasoning to data specified by a user, such as to particular invoice values for the invoices identified by the SRM. As with the semantic reasoning step 1306, the statistical reasoning step may include construction and/or operations and/or other analysis on one or more matrices whose entries have a significance to the data.

While the method shows the semantic reasoning step 1306 performed before the statistical reasoning step 1308, the steps may be performed in another order or at the same time. For example, a PBRM may be used to identify suspicious values in the Semantic data store and a SRM may then identify employees and other semantic objects associated with the suspicious values. Further, also described above, a plurality of SRMs and/or PBRMs may be used to reason data in the semantic data store and may reason data in series and/or in parallel. Also, reasoning modules other than SRMs and PBRMs may be used as well. In order to provide customizability and/or scalability, each reasoning module may be adaptable to receive as input from other reasoning modules. For instance, operations in an embodiment where matrices are used, such as those described above, the dimensions of a matrix output by a reasoning module are used by another reasoning module so that operations on the matrix by the other reasoning module proceed properly. The dimensions may vary based on the amount or other characteristics of data being reasoned.

In an embodiment, at a results step 1310, results of the reasoning are provided to the user. Providing the results may include causing the display of information corresponding to the results through a graphical user interface of the system. The results may be presented in various forms which may employ text, graphics, video, audio, and other features. For example, graphs that illustrate statistical relationships between semantic objects may be displayed, as may text describing the relationships.

Figure 14:
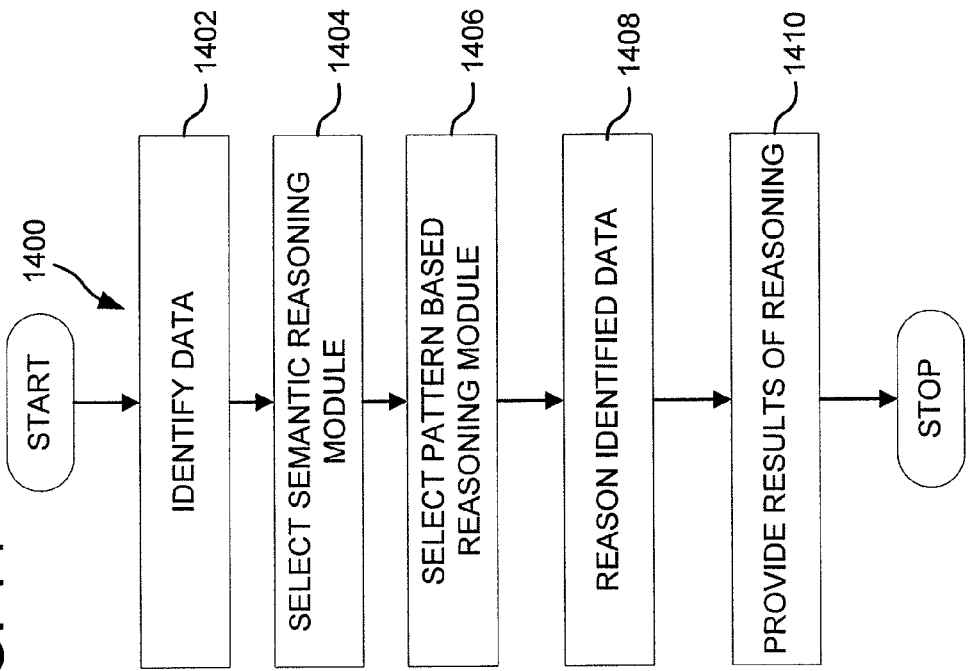
FIG. 14 shows a method for modularly reasoning data in accordance with another embodiment.

FIG. 14 shows a method 1400 for directing reasoning of semantic data, in accordance with an embodiment. Steps of the method shown in FIG. 14 may be used, for example, to allow a user to specify which data should be analyzed and which reasoning modules should be used. Thus, steps of the method shown in FIG. 14 may be used to allow a user to specify how the method shown in FIG. 13 (or variations thereof) should be performed. The method 1400 may be performed pursuant to interaction of a user with a graphical user interface, such as an interface having one or more of the features described below, where the interaction may involve use by the user of one or more input devices. At a data identification step 1402, data is identified in accordance with an embodiment. For instance, a user may specify, through an interface, data in which he or she is interested and, based at least in part on input from the user, appropriate data is identified. Identifying data may include specifying types of semantic objects, such as invoices, and identifying corresponding data in the semantic data store, such as specific invoices created by employees of an organization. One or more attributes of semantic object types may also be specified, such as ranges for values on invoices, employees or a certain rank, and the like.

In an embodiment, at a SRM selection step 1404, an SRM is selected. Selection of the SRM may be based at least in part on user input, which may be received during performance of the data identification step 1402. For example, if a user specifies that he or she would like to analyze all invoices belonging to a particular employee or group of employees, an SRM configured to identify invoices associated with the employee(s) may be selected. At a PBRM selection step 1406, in an embodiment, a PBRM is selected. As with the SRM, selection of the PBRM may be based at least in part on user input. For example, if a user specifies that he or she would like to analyze the correlation between invoice values and other semantic objects, a PBRM operable to perform this analysis may be selected. For instance, a PBRM that constructs a covariance matrix from vectors in a matrix constructed in accordance with the above description may be selected.

While FIG. 14 shows the SRM selection step 1404 occurring before the PBRM selection step 1406, the steps may be performed in another order or at the same time. In addition, as discussed above, embodiments of the present invention provide for scalability. Accordingly, the method 1400 may include selection of a plurality of SRMs and/or a plurality of PBRMs. In other embodiments, one or more SRMs are selected but no PBRMs are selected. Likewise, only one or more PBRMs may be selected without selection of any SRMs.

At a data reasoning step 1408, the identified data is reasoned according to the selected SRMs and PBRMs, in accordance with an embodiment. Reasoning the data may include applying any selected SRMs and PBRMs in an order that is based at least in part on user input. At a results step 1410, results of the reasoning are provided, such as in a manner described above.

As discussed above, users may interact with an interface in order to define the way in which data is analyzed in order to ensure compliance with one or more policies. As an example, a user may interact with an interface in order to define how to detect whether fraud is being committed or is potentially being committed. In an embodiment, users specify parameters that define how analysis of data is to take place. Parameters may be defined using semantic concepts, such as employee, invoice, line item, and the like. The interface may operate according to executable instructions embodied on a computer-readable storage medium.

Figure 15:
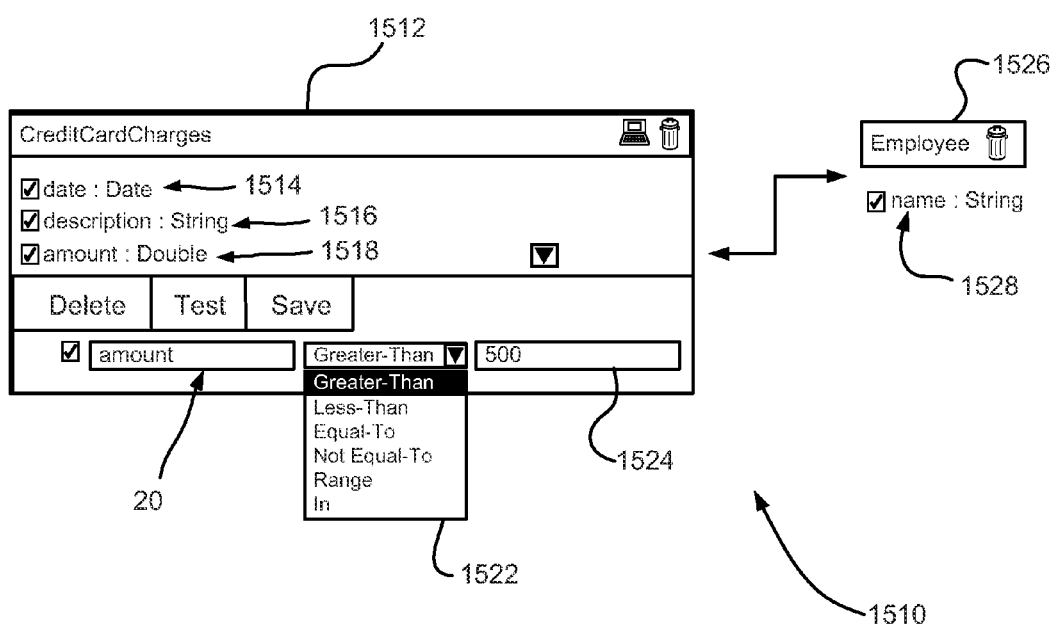
FIG. 15 shows an example of a graphical representation of a policy, in accordance with an embodiment.

As an example, in accordance with an embodiment of the present invention, FIG. 15 shows an example graphical representation 1510 of logic for an analysis to be performed as part of implementation of a policy related to credit card charges, specifically a policy relating to credit card charges over $500. Upon receipt of instructions from a user, a system performing analysis of data according to the graphical representation 1510 may direct a semantic reasoning module to identify from a semantic data store credit card charges on company credit cards that are for amounts greater than $500. Identification of the credit card charges may be performed according to techniques described above, or other techniques. This graphical representation may be used, for example, for the implementation of a business policy specifying that all credit card charges greater than $500 require approval from a specific person or class of persons, such as managers. Identification of such credit card charges using the policy allows for implementation of the business policy.

The graphical representation 1510 includes a credit card charges object 1512 that includes a plurality of options for specifying data that may be related to credit card charges. The specified data may be identified during analysis performed during implementation of the policy. For example, a date checkbox 1514 allows users to specify, by checking the date checkbox 1514, that credit card charges identified during implementation of the policy will include date information about the date on which the charge was made or recorded. Likewise, a description checkbox 1516 and an amount checkbox 1518 allow users to specify that credit card charges identified during implementation of the policy will include a stored description of each charge and/or an amount of each charge, respectively.

In various embodiments, users are able to specify various criteria so that implementation of a policy results in the identification of information matching or closely matching the criteria. For example, continuing the example of FIG. 15, the credit card charges object 1512 includes an amount comparison field 1520 that allows users to specify that credit card charges that are to be identified by implementation of the corresponding policy should have amounts matching certain criteria. In the example shown, the amount comparison field 1520 includes an amount condition dropdown box 1522 and an amount entry field 1524 which collectively allow a user to enter an amount into the amount entry field 1524 and specify, using the amount condition dropdown box 1522, what amount identified credit card charges should have in comparison with the amount entered into the amount entry field 1524. In the example shown, a user has selected that each credit card charge identified by the policy should have an amount greater than 500 dollars. In various embodiments, credit card charges not matching the selected criteria may be identified by implementation of a policy, such as when few or no results match the selected criteria. For example, continuing the example shown, if implementation of the policy corresponding to the graphical representation 1510 does not result in any credit card charges identified, credit card charges having amounts less than but near 500 may be included. In accordance with an embodiment, fields may be added to or removed from graphical objects, as appropriate.

As noted above, various objects may be associated with one another, for example by graphically linking the objects together, for various purposes. For instance, the graphical representation 1510 includes an employee object 1526 which, in the example shown FIG. 15, has been associated with the credit card charges object 1512 by connecting the objects together with a line. In this specific example, the results of associating the employee object 1526 with the credit card charges object are that a credit card charge identified by implementation of the policy includes information identifying the person who made the charge, such as the name of the employee which may be specified by a name checkbox 1528 of the employee object 1526. Thus, when the policy associated with the graphical representation 1510 is executed, an SRM may identify from a semantic data store credit card charges having the specified properties. A second SRM may take the identified credit card charges as input and identify names of the employees that made the identified charges. The credit card charges and names may be associated with one another in one or more data records, such as in a table in a relational database. Also, the credit card charges and names may be displayed to a user (such as in a table, spreadsheet, or other format) and/or may be used as input into another reasoning module, such as a PBRM or another SRM, depending on directions from a user.

As seen in the drawing, the credit card charges object includes a "delete" button, a "test" button, and a "save" button. Other elements of an interface employing embodiments of the present invention may include these buttons, and/or similar buttons or other elements that perform the same and/or similar functions. In an embodiment, the "delete" button allows a user to delete the policy, thereby disallowing access to the policy and/or removing the policy from computer memory. The "test" button, in an embodiment, allows a user to analyze data according to the parameters that he or she specified. For instance, selection of the "test" button in FIG. 15 may cause a computer system to analyze data in a semantic data store in order to identify credit card charges greater than $500 and display the identified charges with their associated dates, descriptions, and amounts. As discussed above, data in the semantic data store may be stored in a relational database. In this instance, selection of the "test" button may result in appropriate queries being made to the database to identify data according to the defined analysis. Further, one or more matrices may be defined and appropriate matrix operations may be performed. Also, selection of the "test" button may cause only a portion of a data store to be analyzed, which may be useful when complete analysis would take a long time due to the size of the data store but the user simply wants to determine whether the analysis that he or she designed results in desired information being returned.

Moving on to the "save" button, in an embodiment, the "save" button allows a user to save the graphical representation, or other information corresponding to the graphical representation, in computer memory, which may be non-volatile. The policy may be saved in memory as a set of instructions that instruct a computer system to perform an analysis of the data according to specified parameters. A user may access a saved analysis from memory and analyze data according to the policy and/or may utilize the policy in connection with other policies. For instance, a user may utilize techniques described herein in order to use a policy as a component in another analysis and/or to modify the analysis.

Figure 16:
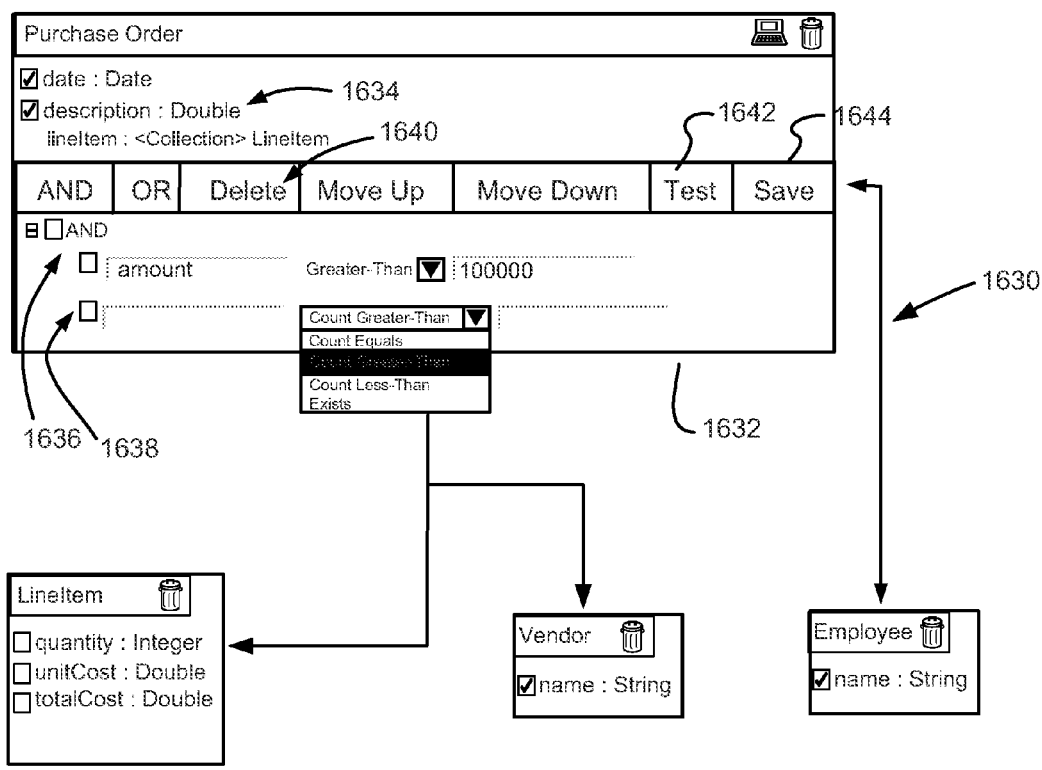
FIG. 16 shows an example of another graphical representation of a policy, in accordance with an embodiment.

FIG. 16 shows another example of a graphical representation 1630 created by a user in order to create an analysis, in accordance with an embodiment. The graphical representation 1630 includes a purchase order object 1632 which has features similar to the credit card charges object 1610, described above. For example, the graphical representation 1630 includes a plurality of checkboxes 1634, the selection of which specifies information to be included with purchase orders identified by implementation of the policy.

The graphical representation 1630 shown also includes fields for selecting criteria for various pieces of information associated with purchase orders. Boolean operators are also included in order to provide substantiality for how the criteria are selected. For example, in the example of FIG. 16, an amount comparison field 1636 and a line item comparison field 1638 are selected and connected together with an AND operator so that criteria selected with the amount comparison field 1636 and with the line item comparison field 1638 both must be matched or closely matched during implementation of the policy. Other operators, such as OR operators or other Boolean or non-Boolean operators may also be included. Various controls for arranging fields, such as a delete control 1640 for deleting fields, may be included to provide robust functionality for creating policies. Other controls, such as a "test" control 1642 for testing a created analysis, and a "save" control 1644 for saving an analysis, may also be included.

In accordance with various embodiments, other features are included for user-definition of analyses performed in connection with implementation of policies. For instance, in accordance with an embodiment, various graphical objects corresponding to data analysis techniques are included so that a user may include one or more of the graphical objects into a graphical representation of an analysis to be performed as part of implementation of a business policy so as to indicate that the data analysis technique should be applied during implementation of the policy. As an example, an icon representative of an algorithm for detecting micropayment fraud may be placed onto a graphical object, such as an object representative of an invoice, to indicate that the algorithm should be applied A plurality of graphical objects representative of commonly-used data analysis techniques may be included for selection by a user. In addition, users may create their own data analysis techniques or modify and/or combine data analysis techniques in order to create custom data analysis techniques.

Figure 17:
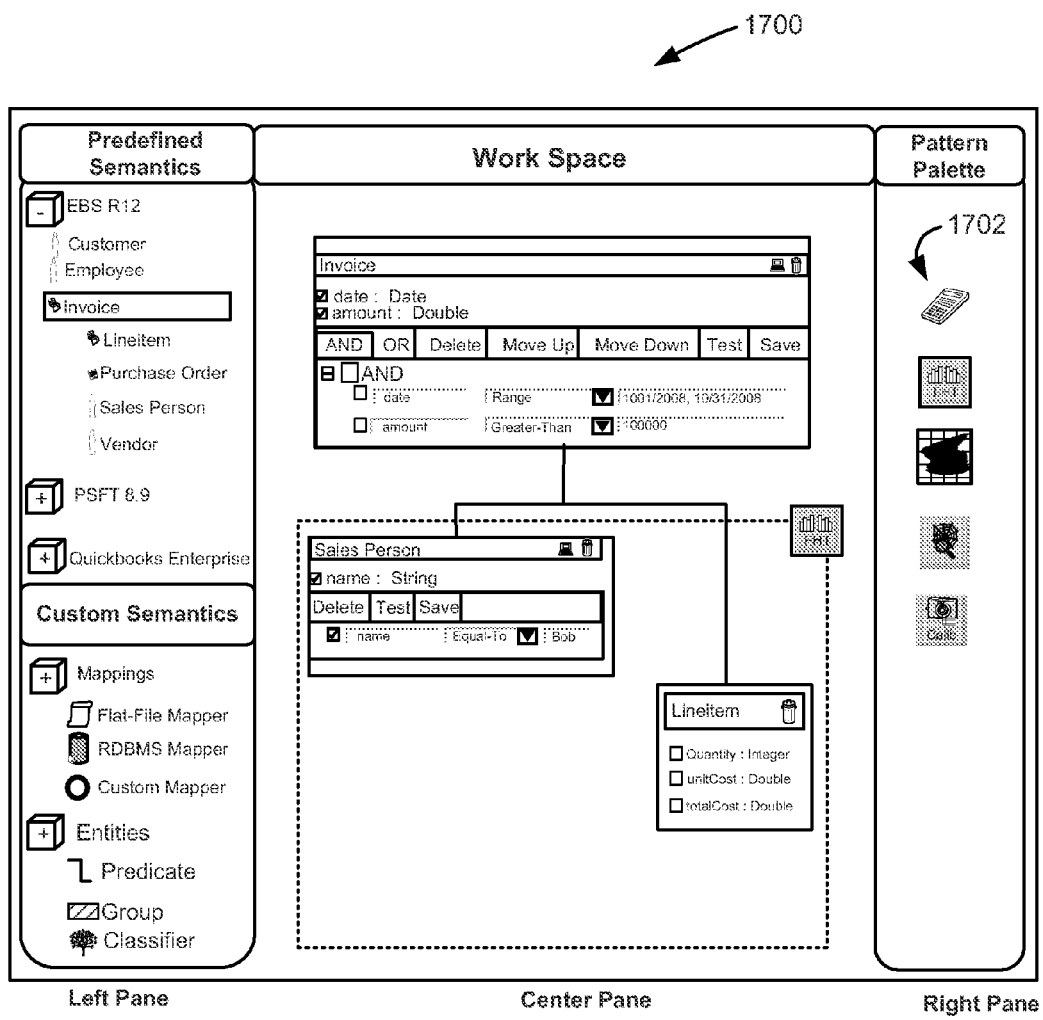
FIG. 17 shows an example of yet another graphical representation of a policy, in accordance with an embodiment.

Accordingly, FIG. 17 shows an example of an interface 1700 of a tool for designing analyses used during implementation of policies, in accordance with an embodiment. The interface may behave according to executable instructions embodied on a computer-readable storage medium. In the example shown, the interface 1700 is divided into three vertical columns, although other arrangements are possible and, in an embodiment, the arrangement is changeable according to user input. As shown, the middle column is labeled as "Work Space" and the right column is labeled as "Pattern Palette." Also as shown, the left column includes two rows, the upper row being labeled as "Predefined Semantics" and the second being labeled as "Custom Semantics." In the Predefined Semantics row, a plurality of semantic elements are provided as selectable interface elements. In an embodiment, the predefined semantics may include graphical representations of semantic objects that are provided for use with common software programs. For instance, in the example shown, predefined semantics are included for E-Business Suite application (EBS), PeopleSoft (PSFT) available from Oracle Corporation, and Quickbooks Enterprise available from Intuit, Inc. As shown in the example, predefined semantics may be provided through interface elements (shown as cubes having a plus sign or a minus sign) which may be selected to show the predefined semantics for the associated software (by selecting a cube with a plus sign) or to hide the predefined semantics for the associated software (by selecting a cube with a minus sign).

In an embodiment, the semantic elements in the Predefined Semantics row correspond to data items that are commonly used when enforcing policies. For instance, in the example shown, the semantic elements associated with EBS include a customer element, an employee element, and invoice element. Elements may also include sub-elements. For instance, in the example shown, the invoice element includes elements commonly associated with invoices, such as a line item sub-element, a purchase order sub-element, a sales person sub-element, and a vendor sub-element.

A user may interact with the elements on the interface 1700 in various ways. For instance, a user may use a mouse or similarly operational input device to select an element and drag the element into the Workspace column (i.e. the middle column labeled as "Work Space"). Upon dropping the item into the Workspace column (for instance by releasing a mouse button), a box corresponding to the element may appear in the Workspace column. For example, an Invoice box 1702 may appear in the Workspace column upon dragging and dropping an Invoice element from the Predefined Semantics row of the left column into the Workspace column. The box may include elements associated with invoices, as described above.

In the Custom Semantics row of the left column, in an embodiment, the interface may include one or more elements (tools) that allow a user to define custom semantics, such as by labeling items in a data store that do not correspond to any of the predefined semantics or that do correspond to one of the predefined semantics, but where the correspondence is not automatically recognized. Users may also define custom semantics using the tools provided in order to define analysis for policies, such as in a manner described above. In the example shown, the custom semantics includes two categories of custom semantics, a "Mappings" category and an "Entities" category. In an embodiment, the Mappings category includes tools for mapping data from various data sources to semantic objects. For instance, as shown, the Mappings category includes a flat-file mapper for mapping data from flat-files, a RDBMS mapper for mapping data from relational databases, and a custom mapper for mapping data from other data sources. Each of the mappers, when selected, may provide an interface for identifying data from one or more data sources.

Software providing the interface may utilize an API of the data source in order to gain access to the data and the interface may allow developers to input commands, according to an API, which are not pre-loaded with the software. As an example, software providing an interface of the RDBMS mapping tool may utilize the API of a particular RDBMS to gain access to tables of a relational database. A user may specify, for example, that data in a particular column of a particular table correspond to a particular semantic object. For instance, the user may specify that data in a column identify customer names. In an embodiment, once mappings are made using any of the tools in the Mappings category, the mappings may be saved and semantic entities mapped to data sources may appear appropriately in the Predefined Semantics row.

Tools in the Entities category, in an embodiment, provide for building analyses for policies using various semantic objects. For instance, a predicate tool, in an embodiment, allows one to specify an association between two semantic entities such that, when data is analyzed according to an analysis that has been defined, data that has the specified association is identified. Graphically, the predicate tool connects two graphical objects representative of semantic entities with a line or other device representative of an association. In the example shown in the Work Space column, an Invoice object is connected to a Sales Person object with a line and the Sales Person object specifies the name of sales person. In this manner, when data is analyzed according to the example arrangement of graphical objects defined in the Work Space column, invoices that are identified will be associated with a sales person (or perhaps several sales people) whose name is Bob. In an embodiment, if the checkbox next to "name" in the Sales Person graphical object is not checked, then invoices would be identified as well as sales people associated with the identified invoices, regardless of their name. In a similar manner, a Lineitem graphical is shown as connected to the Invoice graphical object with a line, thereby specifying that lineitems for identified invoices should be identified. In this manner, a user may specify the types of information he or she would like to view in connection with any identified invoices.

Another tool in the Entities category, in an embodiment, is a Group tool which, allows a user to specify that certain semantic objects are part of a group such that one or more actions may be taken with respect to the group. In an embodiment, the Group tool allows users to graphically surround a plurality of graphical objects in order to specify that semantic objects represented by the graphical objects are part of a group. For instance, in the Work Space column, the Sales Person graphical object and the Lineitem graphical object are surrounded by a rectangle having a dashed border, thereby indicating that sales people and line items applicable to the defined analysis are part of a group. In the example shown, an icon labeled FHT has been superimposed onto the border defining the group, indicating that a Fast Hough Transform (FHT) should be computed for the data associated with the grouped graphical objects. In an embodiment, the FHT icon is superimposed onto the border of the group through a drag and drop operation by a user from another location on the screen, as described below, although any type of user interaction with the interface may be used in addition, or as an alternative to a drag and drop. Further, the FHT icon (or any of the other icons that may be used, described more completely below) may be assigned to a group through other actions, such as by a user indicating (perhaps through a drag and drop) that the FHT icon should appear on the border of the group, in the space surrounded by the group, or through any other specified user action.

Also in the Entities category, in an embodiment, a Classifier tool allows users to define new semantic entities or to modify existing semantic entities. For example, if a company sells widgets, "widgets" may not appear as a predefined semantic entity, but it may wish to define one or more analyses that utilize data related to its widgets. In an embodiment, upon selection of the Classifier tool, the user is provided with an opportunity to create or modify a semantic entity. Creation and/or modification of the semantic entity may involve providing a name to the entity and specifying which attributes the entity should have. In addition, a user may be able to define the data types of the attributes of a semantic entity (such as integer, double, string, and the like) and/or the data types may be determined based on a mapping of the semantic entity to a data source (which may be completed using one of the mapping tools discussed above). For instance, if a column in a RDBMS contains integers and that column has been mapped to an attribute of a created entity, then the attribute of the semantic entity may automatically be assigned an integer data type.

As discussed above, various types of statistical analysis may be performed for data represented by graphical objects. In an embodiment, the Pattern Palette includes a plurality of graphical icons, each representative of a type of analysis that may be performed. For instance, as discussed above, the pattern palette includes an FHT icon for performing Fast Hough Transforms. In addition, a Calculator tool 1702 may be provided for performing more simple analysis, such as addition, subtraction, multiplication, division, and the like, among data corresponding to one or more of the graphical objects in the Work Space column. For instance, the Calculator tool may be used to identify the difference between list prices and sale prices for items identified according to an analysis defined in the Work Space column. If applicable, such as with the Calculator tool, a user may be provided controls that allow the user to select or otherwise define how the tool behaves. The controls may be provided automatically upon selection of the tool or may be provided upon one or more specified user actions with the graphical icon representative of the tool and/or other interactions with the interface.

The Pattern Palette, or other portion of a user interface, may include other graphical representations of analyses that may be performed on data represented by graphical objects selected and/or grouped by the user. For example, graphical representations, such as icons or other objects, may be provided for each of the statistical analyses discussed above and/or for user-defined analyses. Further, in another embodiment, a user may group graphical representations of semantic objects in the Work Space without using the Grouping tool discussed above by dragging a graphical representation of an analysis around the graphical representations to be grouped, or in other ways.

Figure 18:
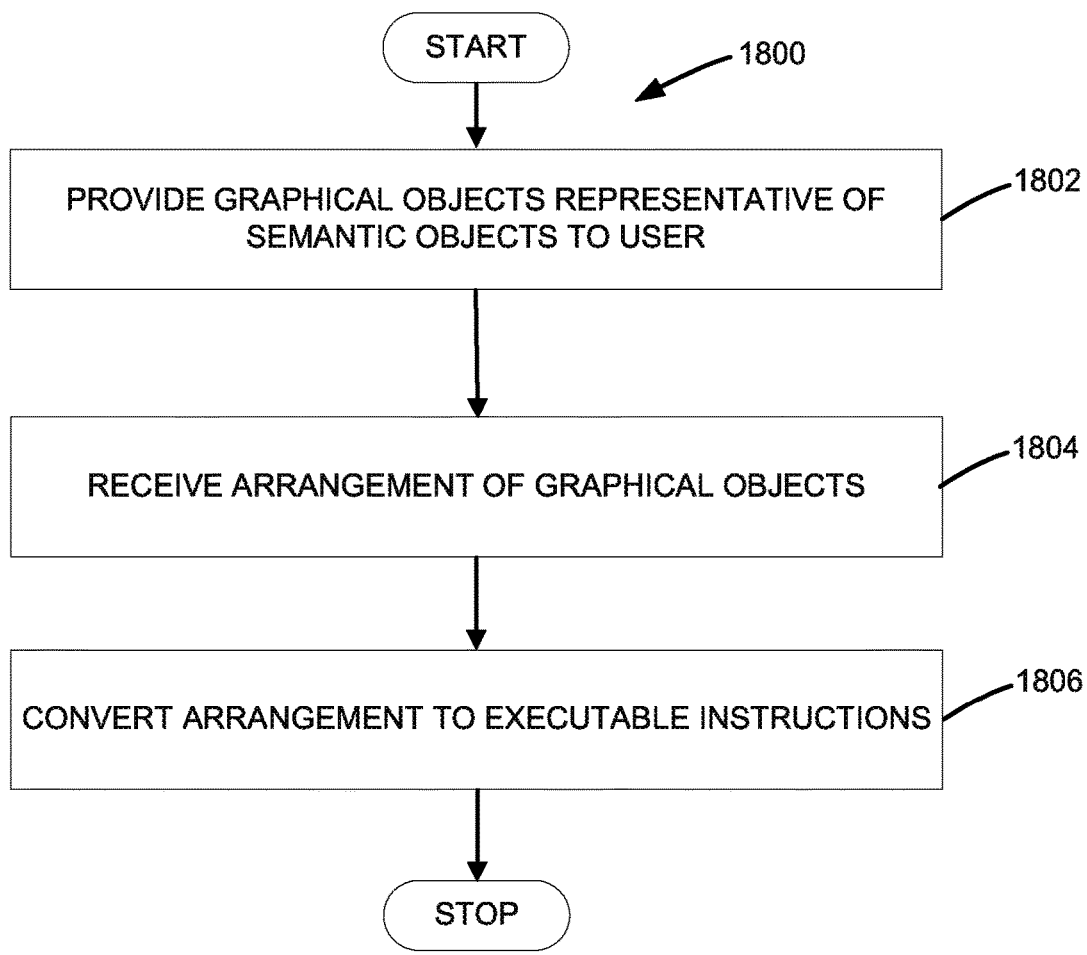
FIG. 18 shows a method for creating policies, in accordance with an embodiment.

FIG. 18 shows a method 1800 for creating policies, in accordance with an embodiment. The method shown in FIG. 18, or variations thereof, may be implemented by software (e.g., code, instructions, program) executing on a processor, by hardware, or combinations thereof. The software may be stored on a computer-readable storage medium, for example, in the form of a computer program comprising a plurality of instructions executable by one or more processors.

In an embodiment, the method 1800 includes providing a graphical objects representative of semantic objects to a user at an object providing step 1802. For example, one or more computer systems may cause display of a graphical user interface that a user may interact with using an input device of the computer system(s) in order to cause the graphical objects to appear and/or the interface may include a plurality of displayed graphical objects that the user may select and/or move using the input device. The graphical objects may be similar to those illustrative examples described above, although their appearance may vary. In addition, graphical objects representative of particular types of data analysis, such as those described above, may be provided as well.

In an embodiment, at an arrangement receipt step 1804, an arrangement of graphical objects is received. Receiving the arrangement of graphical objects may include receiving a series of commands from the user via the input device, where the series of the commands indicates which objects are received and how they are graphically arranged on a display device of the user. For instance, referring to the illustrative example of FIG. 17, the graphical arrangement of objects in the Work Space column may have been produced according to user interaction with the interface. Receiving the arrangement of graphical objects may also include receiving data that indicates how the graphical objects have been directed to be arranged by the user. In addition, the arrangement may include one or more graphical objects representative of particular types of analysis, such as pattern or other statistical analysis, as described above.

At a conversion step 1806, in an embodiment, the arrangement is converted to executable instructions for performing analysis that may be implemented, such as in a manner described above. For instance, executable instructions for execution by an application may be generated based at least in part on the arrangement. Conversion of the arrangement, in an embodiment, includes identifying a set of conditions for data fulfilling the conditions to be identified upon execution of the policy, such as data within specified amounts and/or data associated with semantic classes or specific semantic entities. Also, conversion of the arrangement may include construction of executable instructions for implementing the policy based at least in part on the arrangement. Conversion of the arrangement may also include identification of one or more actions to be taken for data that fulfill the conditions, such as display of the data in one or more formats, messages to be sent to specified people and/or to be displayed, and the like.

Figure 19A:
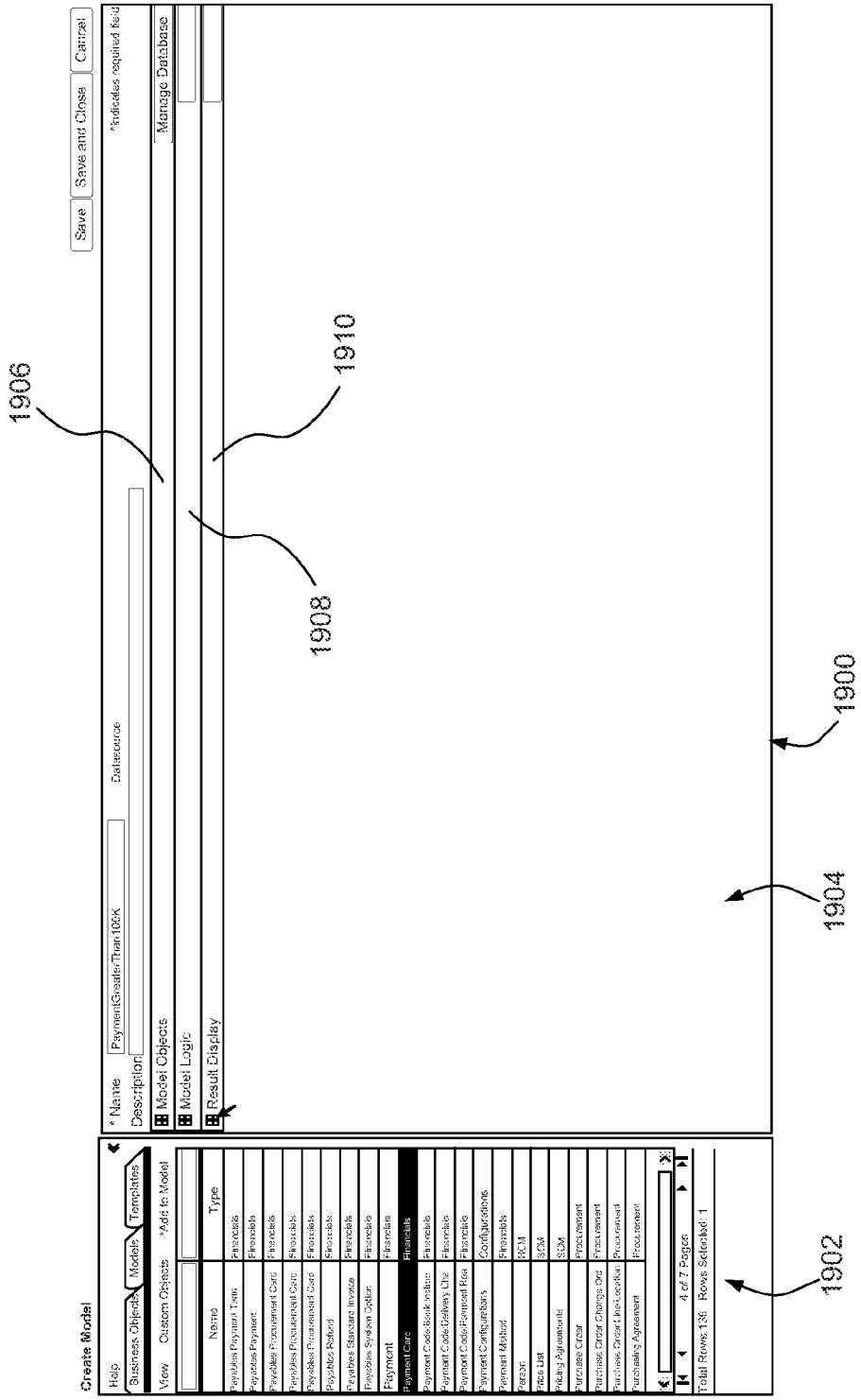
Figure 19B:
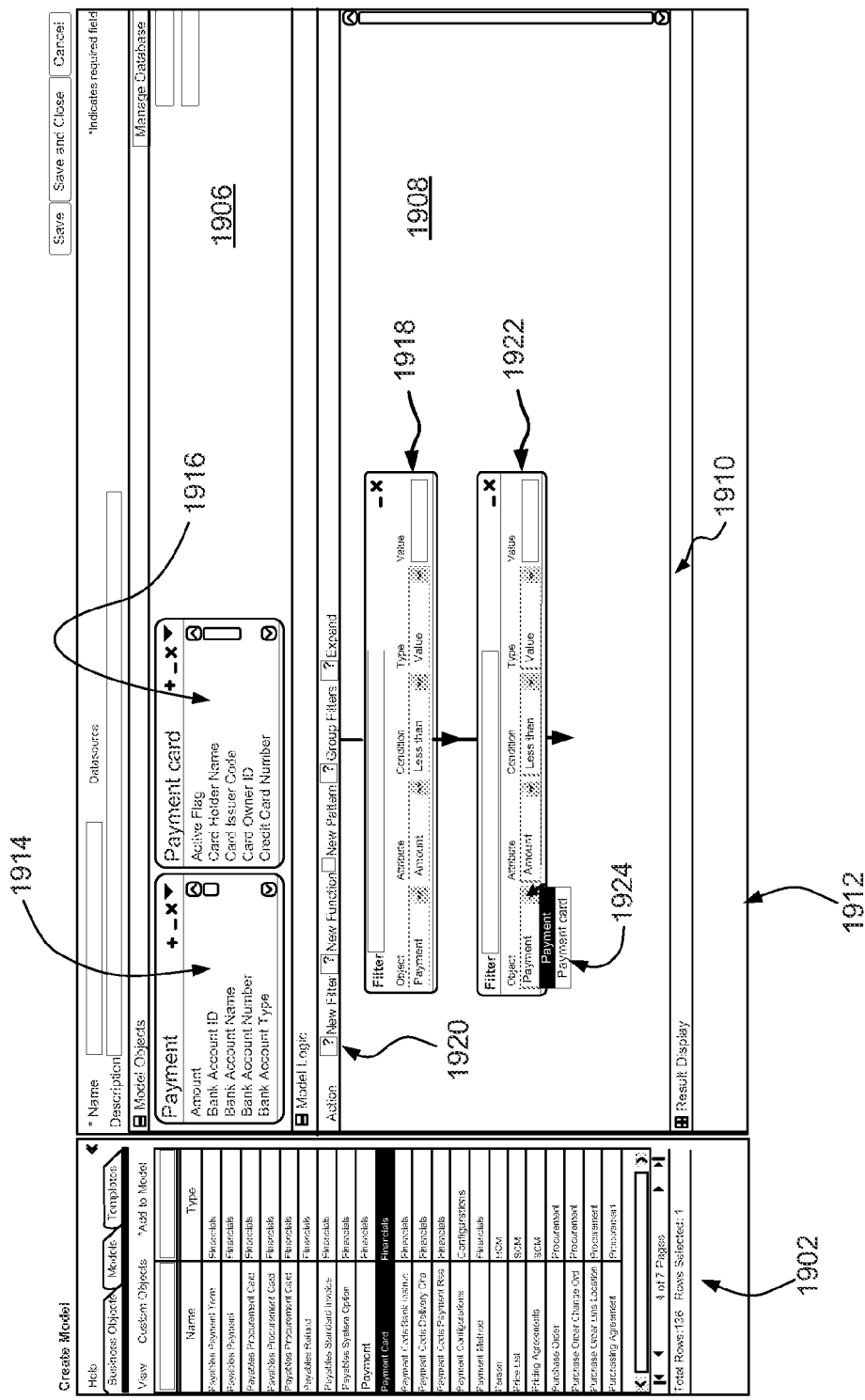

FIGS. 19A-19B show various graphical interface pages of an interface which may be used in practicing one or more embodiments of the invention. FIG. 19A, for example, shows a page 1900 for creating models, where a model is a graphical representation of an analysis to be performed on data according to the model. The model, for instance, may represent one or more conditions (often referred to as a policy) such that data fulfilling or violating the conditions may be identified. In the example shown in FIG. 19A, the page 1900 includes a left pane 1902 and a right pane 1904. As will be described in more detail, the left pane includes a list of semantic objects that can be placed (by a drag-and-drop, double click, or other user interaction with the interface) by a user into the right pane 1904. In the example shown, each semantic object in the left pane includes a description of a general category into which the object is classified. For instance, the left pane 1902 includes a "Payment" object that is shown as belonging to a "Financials" category. Other categories may include "Human Resources," "General Ledger," "customer relationship management" and generally any other category into which semantic objects may be classified.

In an embodiment, the right pane 1904 includes three sub-panes: a model objects sub-pane 1906, a model logic sub-pane 1908, and a results display sub-pane 1910. In an embodiment, each of the sub-panes are expandable and contractible by appropriate interaction with the page 1900 (such as by clicking a "+" to expand or a "−" to contract). As shown in FIG. 19A, all three sub-panes are in a contracted configuration.

FIG. 19B shows a page 1912 in which the model objects sub-pane 1906 and model logic sub-pane 1908 are in an expanded configuration, thereby occupying more space on the page 1912 than as shown in FIG. 19A. In an embodiment, the model objects sub-pane 1906 is used to designate which semantic objects and attributes of those objects will be considered for a model that is constructed in the model logic sub-pane 1908. Boxes or other representations (referred to as model objects) of semantic objects may be located in the model objects sub-pane as a result of various actions, such as a drag-and-drop of a semantic object from the left pane 1902 to the model objects sub-pane 1906, the opening of a file storing information indicative of specific representations of semantic objects being in the model objects sub-pane, or other actions.

As shown in FIG. 19B, the model objects sub-pane includes two model objects indicated by boxes (although other shapes may be used), a payment box 1914 and a payment card box 1916. One or more of the model objects in the model objects sub-pane 1906 may include any attributes associated with semantic model objects represented by the model objects. For instance, the payment box 1914 includes attributes associated with payments, such as "amount," "bank account ID," "bank account Name," and others. The payment card box 1916 (which may represent credit, debit, or other payment cards), for example, includes attributes such as "active flag" (indicating whether a credit card is active or inactive), "card holder name," "card issuer code," and others.

Turning to the model logic sub-pane 1908, the model logic sub-pane, in an embodiment, is a portion of the interface where graphical objects may be manipulated in order to define logic by which data analysis should proceed. Graphical objects may appear in the model logic sub-pane 1908 by clicking or otherwise selecting icons associated with the objects. For example, in the example of FIG. 19B, a first filter object 1918 may have appeared in the model logic sub-pane 1908 as a result of a user selecting a filter icon 1920. A filter object, in an embodiment, is a graphical object that represents or that can be manipulated to represent a semantic object. A filter object may also represent or be able to be manipulated to represent one or more conditions for data associated with semantic objects. For instance, the first filter object 1918 shown in the example of FIG. 19B represents payments that have an amount that is less than a specified value (where a user has yet to input a value, as shown in the figure).

As noted, in an embodiment, filter objects can be manipulated to represent semantic objects. In an embodiment, a filter object may represent any of the semantic objects represented by objects in the model objects sub-pane 1906. For example, as shown in the figure, a second filter object 1922 includes a drop-down box 1924 that allows users to select which semantic object is represented with the second filter object. In the example shown, a user may select the second filter object 1922 to represent payments or payment cards because those semantic objects are represented in the model objects sub-pane 1906. Thus, if another model object was in the model objects sub-pane 1906, a semantic object represented by that model object would also appear in the drop-down box 1924, in an embodiment.

In an embodiment, filter objects may include other drop-down boxes or other interface objects that are appropriate to objects or attributes that have already been selected and/or specified. Available drop-down boxes or other elements may dynamically become available as a user interacts with other elements of a filter object. For instance, as shown in FIG. 19B, the first filter object 1918 includes an attribute drop-down box 1926. In an embodiment, the attribute drop-down box 1926 allows users to select one or more attributes associated with the selected object. Thus, as shown, the attribute drop-down box 1926 includes attributes associated with payments, since payments have been selected to be represented by the first filter object 1918. As shown in the drawing, each filter object may include other drop-down boxes and other interface elements that are appropriate to selections and inputs already made by a user.

Figure 19C:
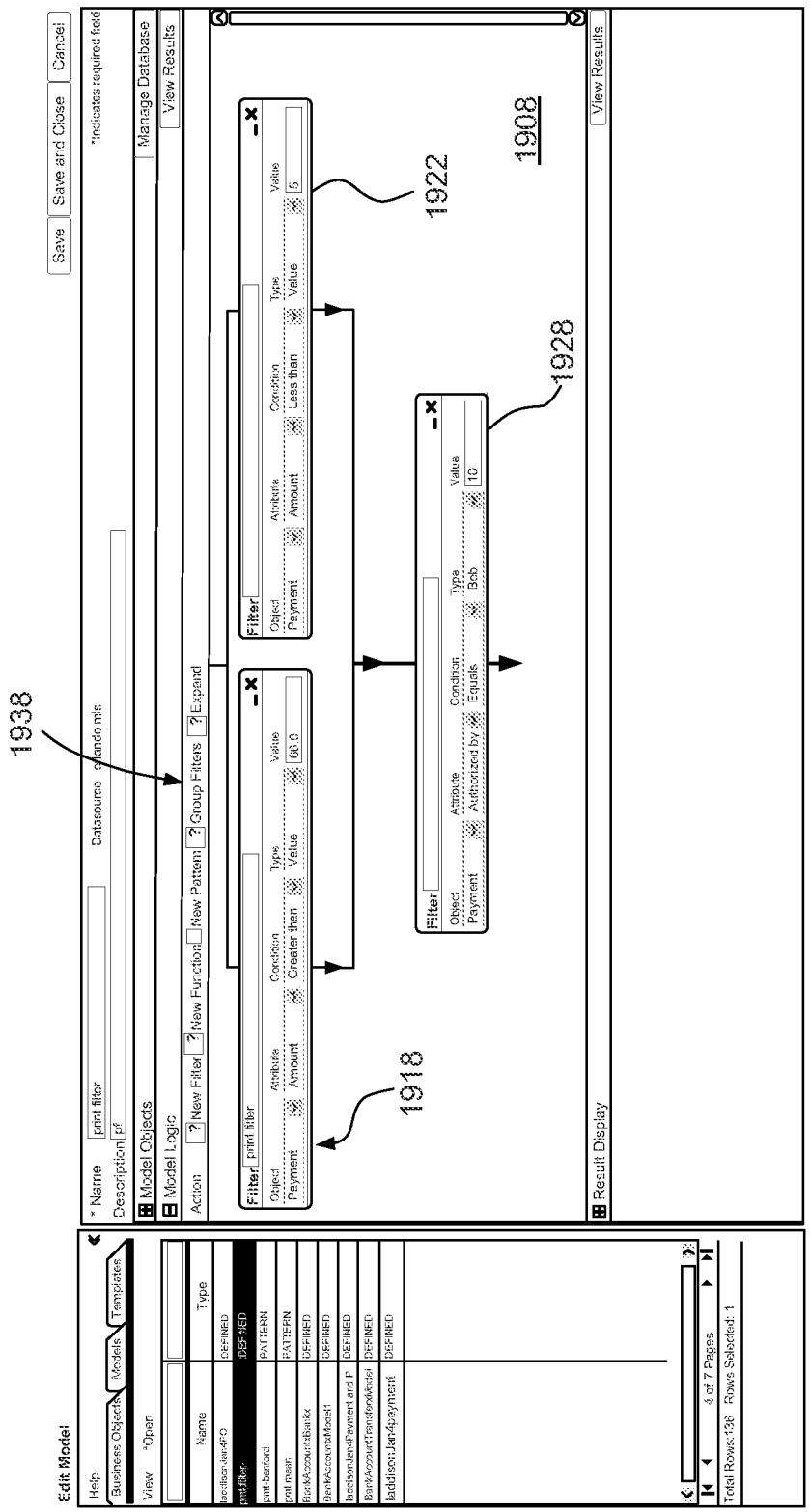

In an embodiment, the graphical arrangement of objects in the model logic pane 1908, as determined by a user, is representative of how analysis of data should proceed. For instance, as shown in FIG. 19B, the first and second filter objects 1918, 1922 are vertically connected, where a vertical connection indicates an AND operation. Thus, for data to be identified by an analysis that proceeds according to the model shown in FIG. 19B, the data must satisfy (or violate, in an embodiment) the conditions set by the first filter object 1918 and second filter object 1922. A horizontal connection, as shown in FIG. 19C, indicates an OR operation such that data identified by an analysis performed according to the model shown in FIG. 19C must satisfy (or violate, in another embodiment) conditions specified by the first filter object 1918 or second filter object 1922. In addition, FIG. 19C shows a third filter object 1928 vertically connected to the first filter object 1918 and second filter object 1922, thereby indicating that data identified by the analysis should satisfy the conditions of the first filter object 1918 or the second filter object 1922 in addition to the conditions of the third filter object 1928. Thus, as shown in the drawing, an analysis performed according to the model of FIG. 19C should identify payments that are greater than $86 or less than $5, but that are made by a person named Bob. Thus, embodiments of the present invention provide an intuitive and flexible way for users to define conditions for data that can be analyzed according to the conditions.

Figure 19D:
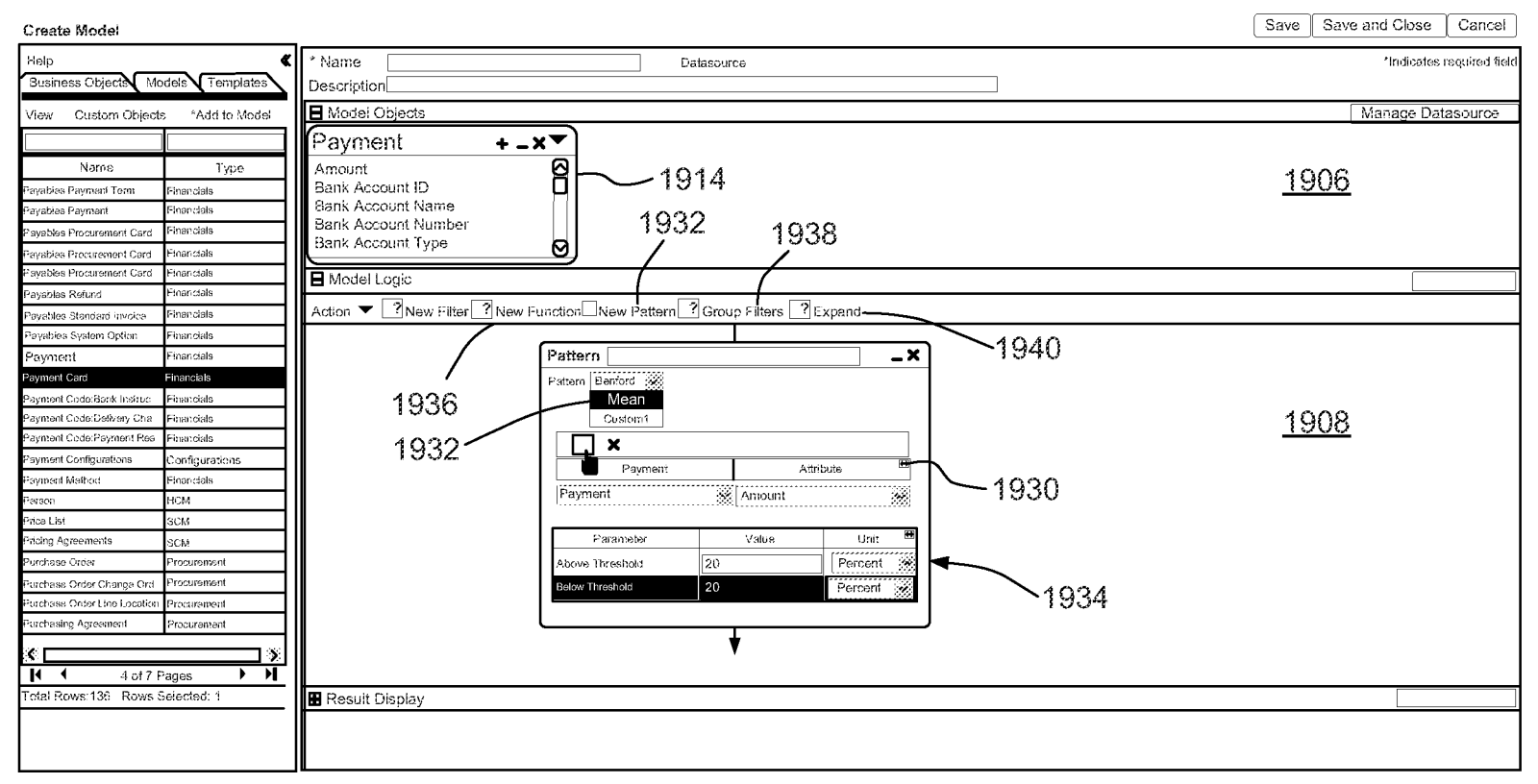

As discussed above, various pattern recognition techniques may be utilized. FIG. 19D shows an example of how pattern recognition techniques may be used in accordance with various embodiments. As shown in the drawing and discussed above, the model objects sub-pane 1906 includes only the payments box 1914, indicating that objects in the model logic sub-pane 1908 should represent or should be able to be manipulated in order to represent payments and/or attributes associated with payments, in accordance with an embodiment. Also shown, in an embodiment, the model logic sub-pane 1908 includes a pattern object 1930. The pattern object 1930 may have appeared in the model logic sub-pane 1908 in response to a user having selected a pattern icon 1932, although the pattern object may appear in response to other actions.

A pattern object, in an embodiment, allows users to set conditions for one or more statistical analyses to be performed in connection with one or more semantic objects represented in the model objects sub-pane 1906. For instance, FIG. 19D only shows payments being represented in the model objects sub-pane 1906 and, as a result, the pattern object 1930 is labeled in a manner indicating that the pattern object is representative of statistical analysis of payments. If more objects had been present in the model objects sub-pane 1906, in an embodiment, the pattern object 1930 may have included a drop-down box or other mechanism for allowing user selection of the semantic objects represented in the model objects sub-pane 1906.

In an embodiment, the pattern object 1930 allows selection of various pattern recognition techniques or other statistical analyses that are applicable to a semantic object represented by the pattern object. For instance, as shown in FIG. 19D, the pattern object 1930 includes a drop-down box 1932 that allows selection of statistical analyses applicable to payments. As shown, the drop-down box 1932 allows selection between Benford analysis or analysis involving mean payment values. Thus, for instance, a user may select "Benford" in the drop-down box 1932 in order to specify, using the pattern object 1930, payments that deviate from a mean.

In an embodiment, pattern objects also are able to be manipulated in order to set conditions for selected statistical analyses. As an example, as shown in FIG. 19D, the pattern object 1930 includes a conditions area 1934 that allows user setting of conditions for the selected Benford analyses. Specifically, users are able to use drop-down boxes to set the amounts by which payments should be above or below a mean. The options available in the conditions area 1934 may be different depending on the type of analysis a user has chosen for the pattern object. For instance, if a user had selected an analysis different from a Benford analysis, the settable conditions in the conditions area 1934 would have been different in order to be applicable to the specific analysis selected. The settings available in the conditions area may dynamically change as other portions of the pattern object are selected and/or otherwise specified.

Pattern objects in the model logic sub-pane 1908 may be combined with other objects, such as filter objects in order to specify a more sophisticated set of conditions for analysis. For example, a filter object representative of payments may be vertically connected to the pattern object 1930 in order to specify other conditions for payments identified by the analysis. Thus, a user may vertically connect a payment filter object to the pattern object 1930 in order to specify that identified payments should be greater than an amount specified by the payment filter object. Horizontal connections of filter objects to pattern objects may specify an OR operation, as described above. Other objects may also be used in the model objects sub-pane 1908 and connected to other objects vertically or horizontally (to specify AND or OR operations, respectively, in an embodiment), or otherwise. In addition, in an embodiment, other tools are available for model definition in order to provide a wide range of user options for defining conditions for analysis.

For example, in an embodiment, the model logic sub-pane 1908 includes a new function icon 1936 which may be selected by a user to perform a function with respect to data associated with objects in the model logic sub-pane. Example functions are addition, subtraction, multiplication, division, square or other roots, exponentiation, trigonometric functions, and generally any function that may be performed in connection with data. Selecting the function icon 1936 may cause a graphic to appear in the model logic sub-pane 1908 where the graphic allows a user to select a function applicable to available objects. As an example, a user may select a subtraction function in order to subtract payment amounts from invoice amounts. Further, functions need not be limited to operations on numerical values, but may perform other operations, such as concatenation of strings and others.

In an embodiment, the model logic sub-pane also includes a grouping icon 1938 and an expand icon 1940. The grouping icon 1938, in an embodiment, allows users to select a group of objects in the model logic sub-pane 1908, such as by using an input device (e.g. mouse, touch screen, or other device) to enclose some or all of the objects in the model logic sub-pane. A selected group of objects can be replaced with a single graphical object (or simply fewer graphical objects). Thus, for example, a user may, by using the grouping icon 1938, group all of the objects shown in the model logic sub-pane of FIG. 19C and replace the group of objects with a single object. In an embodiment, users may provide names for groups of objects and may be able to change settings for the whole group. Thus, complex models in the model logic sub-pane 1908 may be simplified by grouping portions of the models. In an embodiment, the expand icon 1940 may be used in order to change a graphical object representative of a group of objects to the objects represented. For example, a single object representative of the model shown in FIG. 19C may be replaced with the plurality of objects shown in the model logic sub-pane 1908 of the figure through use of the expand icon 1940. The graphical appearance of any model in the model logic sub-pane may be altered in order to accommodate extra space occupied by an expanded group of objects or by less space occupied by a grouped group of objects.

Figure 19E:
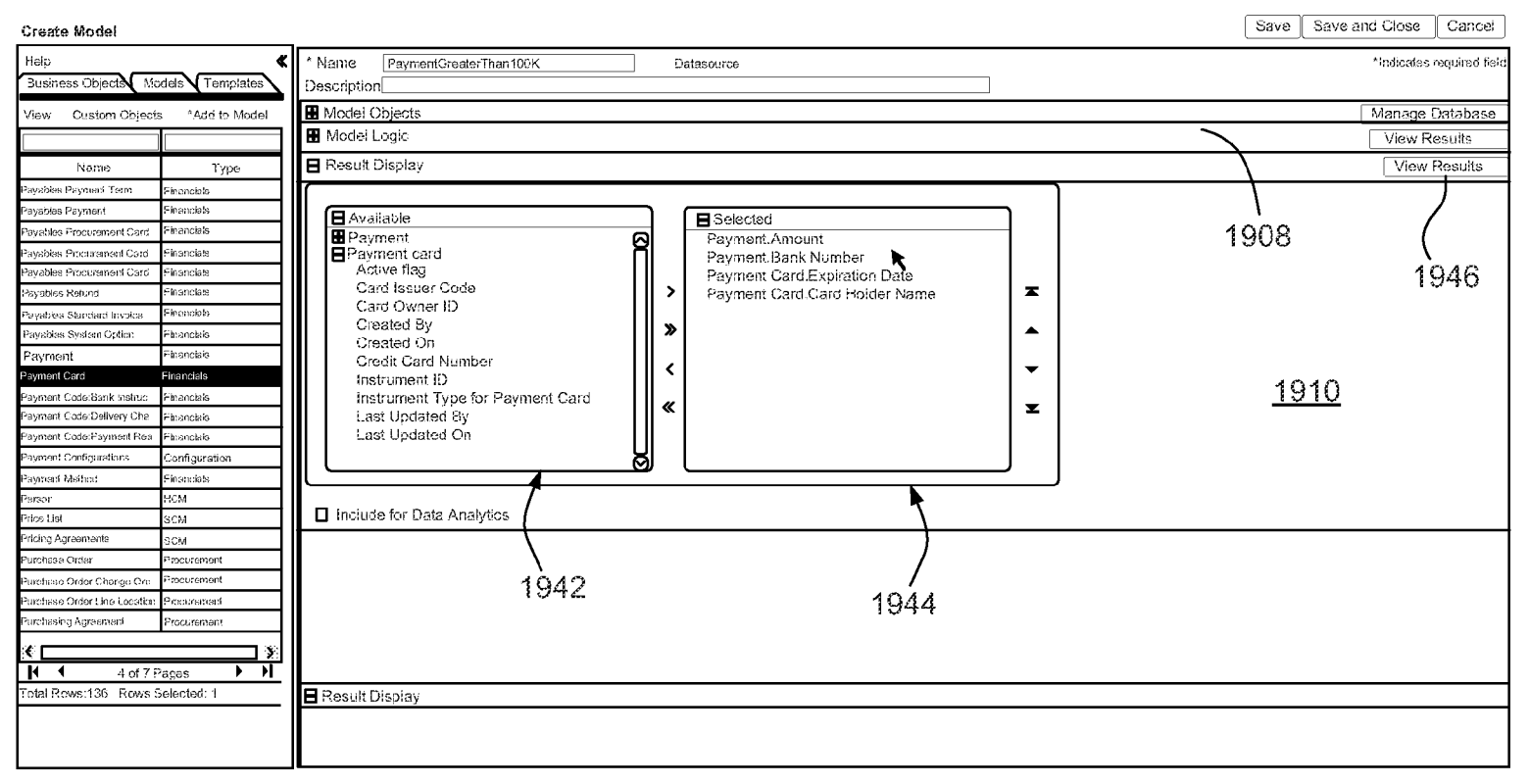

Turning to FIG. 19E, the figure shows an example of the results display sub-pane 1910. In an embodiment, the results display sub-pane 1910 includes graphical objects representative of data identifiable through analysis of data according to the conditions set by a model in the model logic sub-pane 1908. For instance, in the example of FIG. 19E, the results display sub-pane 1910 includes an available objects box 1942 which, in an embodiment, identifies the semantic objects represented by objects used in the model logic sub-pane 1908 and/or model objects sub-pane 1906. As shown in the figure, the available objects box 1942 identifies the payment and payment card semantic objects, for instance, because objects representative of payments and payment cards were used in the model logic sub-pane 1910.

In an embodiment, the available objects box 1942 shows the word "Payment Card" with attributes associated with payment cards listed under "Payment Card." The available objects box 1942 also shows the word "Payment" without any payment attributes listed. In the example shown, a user may cause the display of payment attributes by selecting the "+" next to the word "Payment." Similarly, a user may hide the payment card attributes by selecting the "−" next to the phrase "Payment Card." In an embodiment, when attributes are displayed, a user may select from the attributes shown in the available objects box 1942 in order to specify what kind of data will be shown with data that is identified by analysis performed according to the logic specified in the model logic sub-pane 1908. For instance, the model logic may specify logic for analysis that identifies payment cards that satisfy certain conditions. However, when identifying such payments, other information may be of interest, such as the names of employees that are identified as holders of the identified payment cards. If all information associated with payment cards was identified in the results of analysis, it may be confusing to users who would have to sift through a lot of unwanted information. In this manner, results presented to users are more useful to the users. In addition, better performance may be achieved as a result of a reduction of the amount of data involved in the analysis.

In the embodiment illustrated in the figure, a user specifies attributes for display with analysis results by selecting the attributes in the available objects box 1942 and subsequently selecting a right-pointing arrow between the available objects box 1942 and a selected attributes box 1944. Selected attributes then appear in the selected attributes box 1944, in an embodiment. Attributes that have been selected may be de-selected by selecting one or more attributes in the selected attributes box 1944 and selecting a left-pointing arrow between the available objects box 1942 and the selected attributes box 1944.

In an embodiment, the results display sub-pane 1910 includes a view results icon 1946 that allows a user to select the icon in order to cause a computer system to perform the analysis specified in the model logic sub-pane 1908. Results may be presented in a variety of formats, such as a table with a column for each attribute selected in the results display sub-pane 1910, line graphs, bar graphs, and generally any format that is useful to users depending on the analysis performed.

Variations of the embodiments shown in FIGS. 19A-19E may include other features in addition to those described above or fewer features than shown. Also, features such as those described above in connection with FIGS. 15-18 may also be incorporated into embodiments that take advantage of features of the embodiments described in connection with FIGS. 19A-19E. Also, while the drawings show examples of graphics that may be used in accordance with various embodiments, different graphics may be used.

Generally, although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for defining logic for analysis, comprising:
under control of one or more computer systems configured with executable instructions,
providing graphical objects to a user through an interface, the graphical objects representative of semantic objects;
receiving an arrangement of a subset of the graphical objects, the arrangement representative of logic for an analysis to be performed as part of implementing a policy, said arrangement based at least in part on interaction by the user with the interface, wherein the logic depends at least partially on whether two of the subset of the graphical objects are arranged in one orientation of multiple mutual orientations, and wherein the arrangement of the subset of the graphical objects at least partially defines the policy;
generating, based at least in part on the arrangement, executable instructions for execution by an application configured to operate according to the instructions to monitor transaction data according to the policy, the transaction data corresponding to business activity related to an organization, wherein the policy specifies of a set of conditions and the monitoring comprises monitoring transaction data resulting from future transactions for fulfillment and/or violation of the set of conditions;

encoding business data into an ontology at least in part by extracting information from one or more data stores communicably coupled to the one or more computer systems, converting the information to a uniform format, and storing converted information in the ontology; and processing the ontology to monitor the transaction data according to the policy, the processing the ontology comprising partitioning the ontology into partitions, distributing the partitions over a plurality of reasoner instances that reason the partitions according to the policy, and combining results of the plurality of reasoner instances to create combined results;

wherein the combined results comprise one or more indications of the fulfillment and/or the violation of the set of conditions.

2. The method of claim 1, wherein at least one object of the subset of the graphical objects comprises a field configured to allow definition of criteria for a semantic object corresponding to the at least one object.

3. The method of claim 1, wherein the arrangement includes a first object representative of a first semantic object and a second object representative of a second semantic object, the second semantic object being an attribute of the first semantic object.

4. The method of claim 1, further comprising:
providing an analytic object representative of an analysis to be performed as part of implementing the policy; and
wherein the arrangement is based at least in part on an association of the analytic object representative of the analysis with at least the subset of the graphical objects.

5. The method of claim 1, wherein at least one member of the subset includes an element whose appearance depends on at least one other member of the subset.

6. The method of claim 1, wherein the monitoring is continuous.

7. A system for analyzing data, comprising:
a computing device configured to allow user-creation of an arrangement of objects, each of the objects representative of a semantic object and the arrangement representative of logic for an analysis to be performed as part of implementation of a policy, wherein the logic depends at least partially on whether two of the objects are arranged in one orientation of multiple mutual orientations, and wherein the arrangement of the objects at least partially defines the policy;
at least one data store accessible by the computing device that is configured to store data; and
a policy engine configured to perform the analysis with respect to the data and to monitor transaction data according to the policy, the transaction data corresponding to business activity related to an organization, wherein the policy specifies of a set of conditions and the monitoring comprises monitoring transaction data resulting from future transactions for fulfillment and/or violation of the set of conditions, wherein the policy engine is configured to:
encode business data into an ontology at least in part by extracting information from one or more data stores communicably coupled to the computing device, converting the information to a uniform format, and storing converted information in the ontology; and
process the ontology to monitor the transaction data according to the policy, the processing the ontology comprising partitioning the ontology into partitions, distributing the partitions over a plurality of reasoner instances that reason the partitions according to the policy, and combining results of the plurality of reasoner instances to create combined results;
wherein the combined results comprise one or more indications of the fulfillment and/or the violation of the set of conditions.

8. The system of claim 7, wherein the computing device is further configured to convert the arrangement of the objects to a form suitable for use by the policy engine.

9. The system of claim 7, wherein the arrangement of the objects includes a first object representative of a first semantic object and a second object representative of a second semantic object, the second semantic object an attribute of the first semantic object.

10. The system of claim 7, wherein the computing device is further configured to provide user-defined criteria for the semantic object.

11. The system of claim 7, wherein the computing device is further configured to allow user selection of a data analysis technique to be applied during implementation of the policy.

12. The system of claim 7, wherein the computing device is further configured to include an analytic object as part of the arrangement, the analytic object representative of a particular analysis to be performed by the policy engine when applying the policy.

13. A computer-readable storage medium, which is non-transitory, having stored thereon instructions for controlling at least one processor of one or more computer systems to generate executable instructions, the instructions comprising:
instructions that cause the at least one processor to provide a plurality of objects to a user through an interface, the objects representative of semantic objects;
instructions that cause said at least one processor to receive an arrangement of a subset of the objects, the arrangement representative of an analysis to be performed as part of implementation of a policy, said arrangement based at least in part on interaction by the user with the interface, wherein the analysis depends at least partially on whether two objects of the subset of the objects are arranged in one orientation of multiple mutual orientations, and wherein the arrangement of the subset of the objects at least partially defines the policy; and
instructions that cause said at least one processor to generate, based at least in part on the arrangement, executable instructions suitable for implementation by an application configured to operate according to the instructions to monitor transaction data according to the policy, the transaction data corresponding to business activity related to an organization, wherein:
the policy specifies of a set of conditions and the monitoring comprises monitoring transaction data resulting from future transactions for fulfillment and/or violation of the set of conditions, wherein:
the monitoring the transaction data according to the policy comprises processing an ontology to monitor the transaction data according to the policy,
business data is encoded into the ontology at least in part by extracting information from one or more data stores communicably coupled to the one or more computer systems, converting the information to a uniform format, and storing converted information in the ontology, and
the processing the ontology comprising partitioning the ontology into partitions, distributing the partitions over a plurality of reasoner instances that reason the partitions according to the policy, and combining results of the plurality of reasoner instances to create combined results;

wherein the combined results comprise one or more indications of the fulfillment and/or the violation of the set of conditions.

14. The computer-readable storage medium of claim 13, wherein at least one object of the objects includes a field configured to allow user-definition of criteria for a semantic object corresponding to the at least one object.

15. The computer-readable storage medium of claim 13, wherein the arrangement includes a first object representative of a first semantic object and a second object representative of a second semantic object, the second semantic object being an attribute of the first semantic object.

16. The computer-readable storage medium of claim 13, wherein the instructions further comprise:

instructions that cause the at least one processor to provide an analytic object representative of a data analysis technique to be performed as part of implementing the policy; and wherein the arrangement is based at least in part on an association of an analytic object representative of a data analysis technique with at least the subset of the objects.

17. The computer-readable storage medium of claim 13, wherein the instructions further comprise:

instructions that cause the at least one processor to provide an analytic object representative of an analysis to be performed as part of implementing the policy; and wherein the arrangement is based at least in part on an association of the analysis with at least the subset of the objects.

18. The computer-readable storage medium of claim 13, wherein at least one member of the subset includes an element whose appearance depends on at least one other member of the subset.

19. The computer-readable storage medium of claim 13, wherein the instructions include instructions that cause the at least one processor to receive a grouping of a plurality of members of the subset of the objects and performing a user-specified analysis on data corresponding to the plurality of members.

* * * * *

UNITED STATES PATENT AND TRADEMARK OFFICE
CERTIFICATE OF CORRECTION

PATENT NO. : 9,672,478 B2
APPLICATION NO. : 12/714206
DATED : June 6, 2017
INVENTOR(S) : B'Far et al.

It is certified that error appears in the above-identified patent and that said Letters Patent is hereby corrected as shown below:

On the Title Page

On page 3, Column 1, under Other Publications, Line 42, delete "Systerm" and insert -- System --, therefor.

On page 3, Column 2, under Other Publications, Line 7, delete "iTuned," and insert -- iTunes, --, therefor.

On page 3, Column 2, under Other Publications, Line 70, delete "rnaiied" and insert -- mailed --, therefor.

On page 3, Column 2, under Other Publications, Line 72, delete "maiied" and insert -- mailed --, therefor.

In the Drawings

On sheet 5 of 19, in FIG. 7, under Reference Numeral 702, Line 1, delete "DATE" and insert -- DATA --, therefor.

In the Specification

In Column 9, Line 19, delete "Janjay" and insert -- Sanjay --, therefor.

In Column 19, Line 4, delete "raltioned" and insert -- rationed --, therefor.

In Column 20, Line 14, delete "Partition 1," and insert -- Partition_1, --, therefor.

In Column 20, Lines 14-15, delete "Partition 2," and insert -- Partition_2, --, therefor.

Signed and Sealed this
Twenty-seventh Day of March, 2018

Andrei Iancu
*Director of the United States Patent and Trademark Office*

CERTIFICATE OF CORRECTION (continued)
U.S. Pat. No. 9,672,478 B2

In Column 20, Line 15, delete "Partition N." and insert -- Partition_N. --, therefor.

In Column 22, Line 53, delete "and or" and insert -- and/or --, therefor.